(12) United States Patent
Matsuura et al.

(10) Patent No.: US 12,099,338 B2
(45) Date of Patent: Sep. 24, 2024

(54) PARAMETER SETTING ASSISTANCE DEVICE, PARAMETER SETTING ASSISTANCE METHOD

(71) Applicant: OMRON Corporation, Kyoto (JP)

(72) Inventors: Takanobu Matsuura, Koka (JP); Mamoru Egi, Otsu (JP); Yasushi Ono, Kusatsu (JP)

(73) Assignee: OMRON CORPORATION, Kyoto (JP)

( * ) Notice: Subject to any disclaimer, the term of this patent is extended or adjusted under 35 U.S.C. 154(b) by 190 days.

(21) Appl. No.: 17/434,936

(22) PCT Filed: Mar. 10, 2020

(86) PCT No.: PCT/JP2020/010263
§ 371 (c)(1),
(2) Date: Aug. 30, 2021

(87) PCT Pub. No.: WO2020/189406
PCT Pub. Date: Sep. 24, 2020

(65) Prior Publication Data
US 2022/0147007 A1 May 12, 2022

(30) Foreign Application Priority Data
Mar. 15, 2019 (JP) .................. 2019-049025

(51) Int. Cl.
G05B 19/042 (2006.01)
(52) U.S. Cl.
CPC ..... G05B 19/0426 (2013.01); G05B 19/0423 (2013.01)
(58) Field of Classification Search
CPC ............ G05B 19/0426; G05B 19/0423; G05B 13/04; H02P 29/00
(Continued)

(56) References Cited

U.S. PATENT DOCUMENTS

2013/0238101 A1   9/2013  Kuramoto et al.
2015/0177710 A1   6/2015  Kigaku et al.
(Continued)

FOREIGN PATENT DOCUMENTS

CN   103262404 A   8/2013
CN   106921334 A   7/2017
(Continued)

OTHER PUBLICATIONS

International Search Report issued in International Application No. PCT/JP2020/010263 mailed Apr. 21, 2020. English translation provided.
(Continued)

Primary Examiner — Kenneth M Lo
Assistant Examiner — Tameem D Siddiquee
(74) Attorney, Agent, or Firm — ROSSI, KIMMS & McDOWELL LLP

(57) ABSTRACT

A technique facilitates presetting of parameters for controlling a control target including a load device that has machine parameters such as inertia changeable in accordance with its posture or state. A parameter setting support apparatus (10) for supporting a control apparatus (30) in control parameter setting includes a first specifier (14) that specifies evaluation index values indicating control stability or control performance of the control apparatus (30) based on frequency response characteristics of a control target (40) in postures of the load device (42) having maximum inertia and minimum inertia, and a second specifier (14) that specifies a combined evaluation index value representing an evaluation index value in the posture of the load device (42) in operation based on the evaluation index values specified, by the first specifier (14), in the postures of the load device (42) having maximum inertia and minimum inertia.

18 Claims, 23 Drawing Sheets

(58) Field of Classification Search
USPC .......................................................... 700/86
See application file for complete search history.

(56) References Cited

U.S. PATENT DOCUMENTS

| | | |
|---|---|---|
| 2017/0111004 A1 | 4/2017 | Yokoyama et al. |
| 2017/0261950 A1* | 9/2017 | Mori .................. G05B 19/0426 |
| 2019/0331522 A1* | 10/2019 | Celikel ................. G01M 15/12 |
| 2020/0201292 A1* | 6/2020 | Cella .................. G05B 23/0221 |

FOREIGN PATENT DOCUMENTS

| | | | |
|---|---|---|---|
| JP | 2006227793 | A | 8/2006 |
| JP | 2008259272 | A | 10/2008 |
| JP | 5200648 | B2 | 6/2013 |
| JP | 2013215818 | A | 10/2013 |
| JP | 2015095035 | A | 5/2015 |
| JP | 2017167607 | A | 9/2017 |

OTHER PUBLICATIONS

Written Opinion issued in International Application No. PCT/JP2020/010263 mailed Apr. 21, 2020. English translation provided.
Office Action issued in Chinese Appln. No. 202080017447.3, mailed Oct. 10, 2023. English translation provided.

* cited by examiner

PARAMETER SETTING ASSISTANCE DEVICE, PARAMETER SETTING ASSISTANCE METHOD

FIELD

The present invention relates to a parameter setting support apparatus, a parameter setting support method, and a parameter setting support program for supporting, in setting parameter values, a control apparatus that controls a control target including a load device and a motor.

BACKGROUND

In a system such as a serial link robot, a load device driven by a motor has machine parameters (including inertia, or moment of inertia) changeable in accordance with the posture of the load device. Thus, various control parameters for a control apparatus that controls a control target (including the load device and the motor) in such a system are to fall within a range of values that enables appropriate control of the control target independently of the posture of the load device. However, known technologies relating to control parameter setting of a control apparatus (refer to, for example, Patent Literature 1) have been developed based on fixed machine parameters of a load device. For a control apparatus for controlling a control target including a load device having machine parameters changeable in accordance with its posture, setting or adjusting various control parameters involves repetition of a series of operations including setting and adjusting control parameter values, evaluation, changing the posture of the load device, and evaluation.

A possible approach to this issue is a method for setting control parameters that enable stable control independently of the posture of a load device by combining adjustment indices in multiple postures of the load device and displaying a map of the combined adjustment indices. Such a method includes obtaining adjustment indices reflecting the typical postures of the load device having its inertia that is changeable, for example, the postures of the load device having maximum and minimum inertia. However, searching for the postures of the load device having maximum and minimum inertia involves estimation of such postures from the structure of the load device or trial-and-error estimation or evaluation of the inertia for all the postures. Thus, searching for the postures of the load device having maximum and minimum inertia causes difficulty. In addition, generating an adjustment index map for each of the multiple postures with a known technique is time-consuming.

A known technique relating to this includes presetting a gain to an inertia change range, obtaining the total inertia in real time, and setting a position loop proportional gain, a velocity loop proportional gain, and a velocity loop integral gain based on the estimated range of the total inertia (refer to, for example, Patent Literature 2). More specifically, the known technique described in Patent Literature 2 determines the velocity loop proportional gain based on a preset maximum velocity response value and the maximum and minimum inertia values estimated in real time, and determines another gain using a constant ratio on the velocity loop proportional gain. However, this technique involves real-time estimation of inertia and may complicate the control and increase the operation load.

In such circumstances, techniques have been awaited for facilitating presetting of parameters for controlling a control target including a load device that has machine parameters such as inertia changeable in accordance with its posture or state.

CITATION LIST

Patent Literature

Patent Literature 1: Japanese Unexamined Patent Application Publication No. 2017-167607
Patent Literature 2: Japanese Patent No. 5200648

SUMMARY

Technical Problem

In response to the above issue, one or more aspects of the present invention are directed to a technique for facilitating presetting of parameter values for controlling a control target including a load device that has machine parameters such as inertia changeable in accordance with its posture or state.

Solution to Problem

A parameter setting support apparatus according to an aspect of the present invention is an apparatus for supporting, in control parameter setting, a control apparatus for controlling a control target including a load device and a motor for driving the load device having inertia changeable in accordance with a posture of the load device in operation. The parameter setting support apparatus includes a first specifier that specifies evaluation index values indicating control stability or control performance of the control apparatus based on frequency response characteristics of the control target in a posture of the load device having maximum inertia and in a posture of the load device having minimum inertia, and a second specifier that specifies a combined evaluation index value representing an evaluation index value in the posture of the load device in operation based on the evaluation index values specified, by the first specifier, in the posture of the load device having maximum inertia and in the posture of the load device having minimum inertia.

In the aspect of the present invention, the first specifier specifies evaluation index values indicating the control stability or control performance of a control apparatus based on the frequency response characteristics of a control target in postures of the load device having maximum and minimum inertia. Based on the evaluation index values, the second specifier specifies a combined evaluation index value representing an evaluation index value in the posture of the load device in operation.

The structure according to the above aspect can thus specify the evaluation index values reflecting the change of inertia of the load device in operation and can set control parameters based on the evaluation index values. The control target herein refers to a system including a load device and a motor that drives the load device. The evaluation index values indicate the control stability or control performance of the control target, and may include, for example, a position loop gain peak value, a velocity loop gain peak value, or both.

In the above aspect of the present invention, the first specifier may obtain the frequency response characteristics of the control target in the posture of the load device having the maximum inertia and in the posture of the load device having the minimum inertia based on a frequency response characteristic in a predetermined reference posture of the load device in operation, on a ratio of inertia of the load device in the reference posture to the inertia of the load device in the posture having the maximum inertia, and on a ratio of the inertia of the load device in the reference posture to the inertia of the load device in the posture having the minimum inertia.

In this structure, the first specifier does not separately obtain the frequency response characteristics of the control target in the posture of the load device having maximum and minimum inertia. The first specifier may obtain the frequency response characteristic of the control target in a reference posture of the load device, and obtain the frequency response characteristics of the control target in the postures of the load device having maximum and minimum inertia based on the ratio of inertia of the load device in the reference posture to the inertia of the load device in the posture with maximum inertia and the ratio of the inertia of the load device in the reference posture to the inertia of the load device in the posture with minimum inertia.

This structure facilitates obtaining of the frequency response characteristics of the control target in the postures of the load device having maximum and minimum inertia. This structure facilitates setting of parameters for controlling a control target including a load device having its inertia that is changeable while the load device is in operation.

In the aspect of the present invention, the first specifier may determine the reference posture as the posture of the load device having the minimum inertia. This structure can obtain the frequency response characteristics in the reference posture and in the posture of the load device having minimum inertia, increasing the possibility of obtaining of a frequency response characteristic in a more stable manner and enabling setting of parameters for more smoothly controlling a control target.

In the aspect of the present invention, the first specifier may specify the evaluation index values in the posture of the load device having the maximum inertia and in the posture of the load device having the minimum inertia for each of a plurality of states of the control apparatus in which the control apparatus has different values for at least one control parameter. The second specifier may specify the combined evaluation index value for each of the plurality of states of the control apparatus.

In this structure, the first specifier specifies evaluation index values for multiple states of the control apparatus, and the second specifier specifies a combined evaluation index value for each state of the control apparatus. This facilitates selection of the state of the control apparatus to obtain an optimum combined evaluation index value, and thus facilitates setting of an optimum control parameter.

The parameter setting support apparatus according to the above aspect of the present invention may further include a display that displays each combined evaluation index value specified by the second specifier in association with information indicating a corresponding state of the plurality of states of the control apparatus each having the specified combined evaluation index value.

In this structure, the display may display, for example, a stability map showing combined evaluation index values in different colors using parameters indicating the states of the control apparatus on the horizontal axis and the vertical axis. The combined evaluation index values are displayed in association with information indicating the states of the control apparatus with specified combined evaluation index values to facilitate setting of optimum parameters.

In the aspect of the present invention, the first specifier may obtain a frequency response characteristic of the load device in operation for a predetermined single frequency to obtain an inertia value of the load device in a predetermined posture.

In this structure, the frequency response characteristic for a single frequency input may be repeatedly checked during the operation of the load device, and the ratio of the inertia in the reference posture to the inertia in each posture may be calculated. This single continuous action can further facilitate obtaining of a range of change of inertia of the load device in operation.

In this structure, the first specifier may calculate the inertia value of the load device in the predetermined posture based on a gain characteristic of the load device in operation for the predetermined single frequency and a predetermined parameter set in advance. The predetermined parameter herein may be a velocity loop proportional gain Kvp and a set inertia value $J_0$. This can facilitate calculation of the inertia value of the load device in each posture based on the gain characteristic, the velocity loop proportional gain Kvp, and the set inertia value $J_0$ with formula (1) described below.

$$\text{inertia } J = (Kvp \cdot J_0)/(\omega \cdot |G(j\omega)|) \tag{1}$$

In the aspect of the present invention, a sinusoidal signal may be superimposed on an operation command signal directed to the load device in operation.

A specific frequency signal is to be used to obtain a frequency response characteristic of a predetermined single frequency during the operation of the load device. However, when the load device operates in response to a command such as a uniform motion command, the operation command contains no frequency signal, and can cause difficulty in obtaining the frequency response characteristic for a single frequency. When an operation command directed to the load device includes multiple frequency components, the load device may fail to correctly obtain the frequency response characteristic for the single frequency, as being affected by the multiple frequency components.

In the aspect of the present invention, a sinusoidal signal is intendedly superimposed on an operation command signal directed to the load device in operation. This more reliably enables the frequency response characteristics to be obtained for a single frequency input independently of the type of operation command. The sinusoidal signal to be superimposed may be a sinusoidal signal relating to the single frequency or the sum of sinusoidal waves of multiple different frequencies.

In the above aspect of the present invention, the sinusoidal signal to be superimposed may have a frequency lower than a resonant frequency and an antiresonant frequency of the load device. When the frequency of the sinusoidal signal to be superimposed is equivalent to or higher than the resonant and antiresonant frequencies, a large gap occurs between an actual control target and a control target model used to obtain the inertia. This may cause a failure in correctly obtaining inertia. In contrast, when the frequency of the sinusoidal signal to be superimposed is smaller than the resonant and antiresonant frequencies of the load device, inertia of the load device can be obtained more reliably and correctly.

As the frequency of the sinusoidal signal to be superimposed, a frequency lower than the resonant and antiresonant frequencies of the load device may be determined based on the frequency response characteristic obtained at the reference position. The resonant and antiresonant frequencies of the load device can be easily obtained, and thus the frequency of the sinusoidal signal can be more easily determined as a frequency lower than the resonant and antiresonant frequencies of the load device.

In the above aspect, the frequency of the sinusoidal signal to be superimposed may be in a band approximate to −20 dB/dec in the open-loop frequency response characteristic at the reference position. When the frequency of the sinusoidal signal to be superimposed is lower than but approximate to the resonant and antiresonant frequencies of the load device, the effect of resonance or antiresonance may cause difficulty in obtaining a correct frequency response characteristic for the single frequency. In contrast, when the frequency of the sinusoidal signal to be superimposed is in a band approximate to −20 dB/dec in the open-loop frequency response characteristic at the reference position, the effect of resonance or antiresonance can be more reliably eliminated, and thus a correct frequency response characteristic for the single frequency can be obtained.

In the aspect of the present invention, during an operation of the load device, the sinusoidal signal may be superimposed on the operation command signal in a section for operating the load device at a constant velocity.

A command to adjust the velocity of the load device may include a signal of frequency to be superimposed to check the frequency response characteristic. The frequency response characteristic for the actually superimposed sinusoidal signal may fail to be correctly obtained. In contrast, in the aspect of the present invention, during an operation of the load device, the sinusoidal signal may be superimposed on the operation command signal in a section for operating the load device at a constant velocity. This reduces the possibility of including unintended frequency signals in the operation command signal, and can more correctly obtain the frequency response characteristic for the superimposed frequency sinusoidal signal.

In the aspect of the present invention, the operation command signal on which the sinusoidal signal is superimposed may include one of a position command, a velocity command, or a torque command. This structure enables appropriate selection of a signal on which a sinusoidal signal is superimposed to obtain the frequency response characteristic, and can improve the degree of freedom in measurement.

In the aspect of the present invention, the control target may include a plurality of load devices coupled to one another. The first specifier may specify the evaluation index value for each of the plurality of load devices included in the control target. The second specifier may specify the combined evaluation index value for each of the plurality of load devices included in the control target, and specify a combined evaluation index value for the control target based on the combined evaluation index value for each of the plurality of load devices.

Examples of the load device include a gantry device that involves simultaneous control of outputs of multiple axes. A control target is regarded as a combination of multiple load devices. In this structure, applying parameters set to a specific axis to another axis may cause an unstable movement of the axis.

In the aspect of the present invention, the first specifier specifies an evaluation index value for each of the load devices included in a control target, and the second specifier specifies a combined evaluation index value for each of the load devices included in a control target to specify a combined evaluation index value for the entire control target based on the combined evaluation index value for each load device.

More specifically, the second specifier may specify, for example, a combined evaluation index value for each of the load devices included in a control target, and determine the lower one of the combined evaluation index values for the load devices as a combined evaluation index value for the entire control target. This structure can obtain a combined evaluation index value for the entire control target that causes the control target including a combination of the load devices to operate stably, and can set control parameters that cause the control target including multiple coupled load devices (axes) to operate more stably.

The parameter setting support apparatus according to the above aspect of the present invention may further include a second display that displays the combined evaluation index value for the control target specified by the second specifier in association with information indicating a corresponding state of the plurality of states of the control apparatus each having the specified combined evaluation index value.

The second display displays a stability map based on a combined evaluation index value for the entire control target including the multiple load devices. More specifically, the second display may display a stability map indicating, as the combined evaluation index value for the entire control target, the lower one of the combined evaluation index values in the stability maps for the load devices. This enables checking of control parameters that cause the multiple load devices (axes) to move stably with a single stability map, and thus enables setting of control parameters that cause the multiple load devices (axes) to move stably and to provide the same outputs.

In the aspect of the present invention, the combined evaluation index value specified by the second specifier may be displayed in association with the information indicating the corresponding state of the plurality of states of the control apparatus each having the specified combined evaluation index value, and the displaying may include displaying a state of the control apparatus having the combined evaluation index value satisfying a predetermined condition together with a predetermined optimum value mark.

The stability map shows combined evaluation index values and marks indicating that the combined evaluation index values satisfy predetermined conditions. This enables clearer and easier display of a combination of control parameters that satisfy predetermined conditions in the stability map.

The predetermined condition may be that a norm from an origin (point at which all the states of the control apparatus associated with the combined evaluation index values are at their minimum values on the display) displayed by the second display is maximum, that the combined evaluation index value is maximum, or that one of the at least one control parameter is maximum.

In the aspect of the present invention, a velocity controller gain may be determined based on the frequency response characteristic of the control target in the posture of the load device having the minimum inertia, and a position controller gain may be determined based on the frequency response characteristic of the control target in the posture of the load device having the maximum inertia.

In the above aspect, the velocity controller gain is determined as the control parameter based on the frequency response characteristic of the control target in the posture of the load device having minimum inertia, and the position controller gain is determined as a control parameter based on the frequency response characteristic of the control target in the posture of the load device having maximum inertia. In this case, velocity controller gains (Kvp and Ki) can be determined based on the frequency response characteristic of the control target in the posture of the load device having minimum inertia, and a position controller gain (Kpp) can be determined as a control parameter based on the frequency response characteristic of the control target in the posture of the load device having maximum inertia. Thus, optimum values for control parameters including the velocity controller gains (Kvp and Ki) and the position controller gain (Kpp) can be obtained more accurately.

A parameter setting support apparatus according to another aspect of the present invention may be an apparatus for supporting, in control parameter setting, a control apparatus for controlling a control target including a load device and a motor for driving the load device having inertia changeable in accordance with a posture of the load device in operation. The parameter setting support apparatus may include a computer having tool software installed. The parameter setting support apparatus may include an instruction unit that provides an instruction about a movement and a posture of the load device to the control apparatus, an obtainer that obtains, from the control apparatus, a signal measured for the load device and corresponding to at least one of a current position, a current velocity, or a current torque of the load device, a single-frequency component obtainer that generates a series of command signals each obtained by superimposing a sinusoidal signal having a single frequency on at least one of a position command, a velocity command, or a torque command for controlling the load device, causes the instruction unit to provide the command signals to the control apparatus, and obtains a gain or a phase shift amount in the single frequency from a signal measured in response to the command signals and obtained by the obtainer, a specific-inertia position estimator that causes the instruction unit to instruct the control apparatus to implement a series of postures formed during movement of the load device in operation, causes the single-frequency component obtainer to obtain the gain or the phase shift amount in the single frequency in each of the postures, and estimates postures with the maximum and minimum inertia from the gain in each posture, a frequency response obtainer that causes the instruction unit to instruct the control apparatus to vibrate the load device within a predetermined frequency range in a reference posture selected from the series of postures, and obtains a frequency response characteristic in the reference posture from the signal obtained by the obtainer, a frequency response estimator that estimates frequency response characteristics of gains in the estimated postures with the maximum and minimum inertia from the frequency response characteristic in the reference posture obtained by the frequency response obtainer and a gain or a phase shift amount for the single frequency in each of the postures obtained by the single-frequency component obtainer, a map generator that generates a maximum inertia stability map in a posture with the maximum inertia and a minimum inertia stability map in a posture with the minimum inertia from the frequency response characteristics estimated by the frequency response estimator, a combined-map generator that generates a combined stability map by combining the maximum inertia stability map and the minimum inertia stability map, and a parameter setting unit that displays the combined stability map, receives designation on a position on the combined stability map, and sets a control parameter based on a vertical axis value and a horizontal axis value of the designated position.

A parameter setting support method according to still another aspect of the present invention may be a method for supporting, in control parameter setting, a control apparatus for controlling a control target including a load device and a motor for driving the load device having inertia changeable in accordance with a posture of the load device in operation. The method may include obtaining a frequency response characteristic for an input signal of a single frequency in a series of postures of the load device in operation, obtaining a frequency response characteristic for a predetermined frequency range in a reference posture selected from the series of postures of the load device in operation, obtaining maximum and minimum inertia values or ratios of inertia obtained in the reference posture to the maximum and minimum inertia values, estimating frequency response characteristics in the posture with the maximum inertia value and the posture with the minimum inertia value, generating stability maps in the posture with the maximum inertia value and in the posture with the minimum inertia value based on the estimated frequency response characteristics in the posture with the maximum inertia value and the posture with the minimum inertia value, combining the stability map in the posture with the maximum inertia value and the stability map in the posture with the minimum inertia value, and setting a control parameter based on the combining the stability maps.

A parameter setting support program according to still another aspect of the present invention may be a program for causing a computer to perform at least one of the obtaining the frequency response characteristic for the input signal of the single frequency, the obtaining the frequency response characteristic for the predetermined frequency range in the reference posture, the obtaining the maximum and minimum inertia values or the ratios of inertia, the estimating the frequency response characteristics in the postures, the generating the stability maps, the combining the stability maps, and the setting the control parameter.

These aspects associated with the above issue may be combined as appropriate for implementations.

Advantageous Effects

The structure according to the above aspects can more easily preset control parameters for controlling a control target including a load device having machine parameters including inertia changeable in accordance with its posture or state.

DETAILED DESCRIPTION

Example Use

Figure 1:
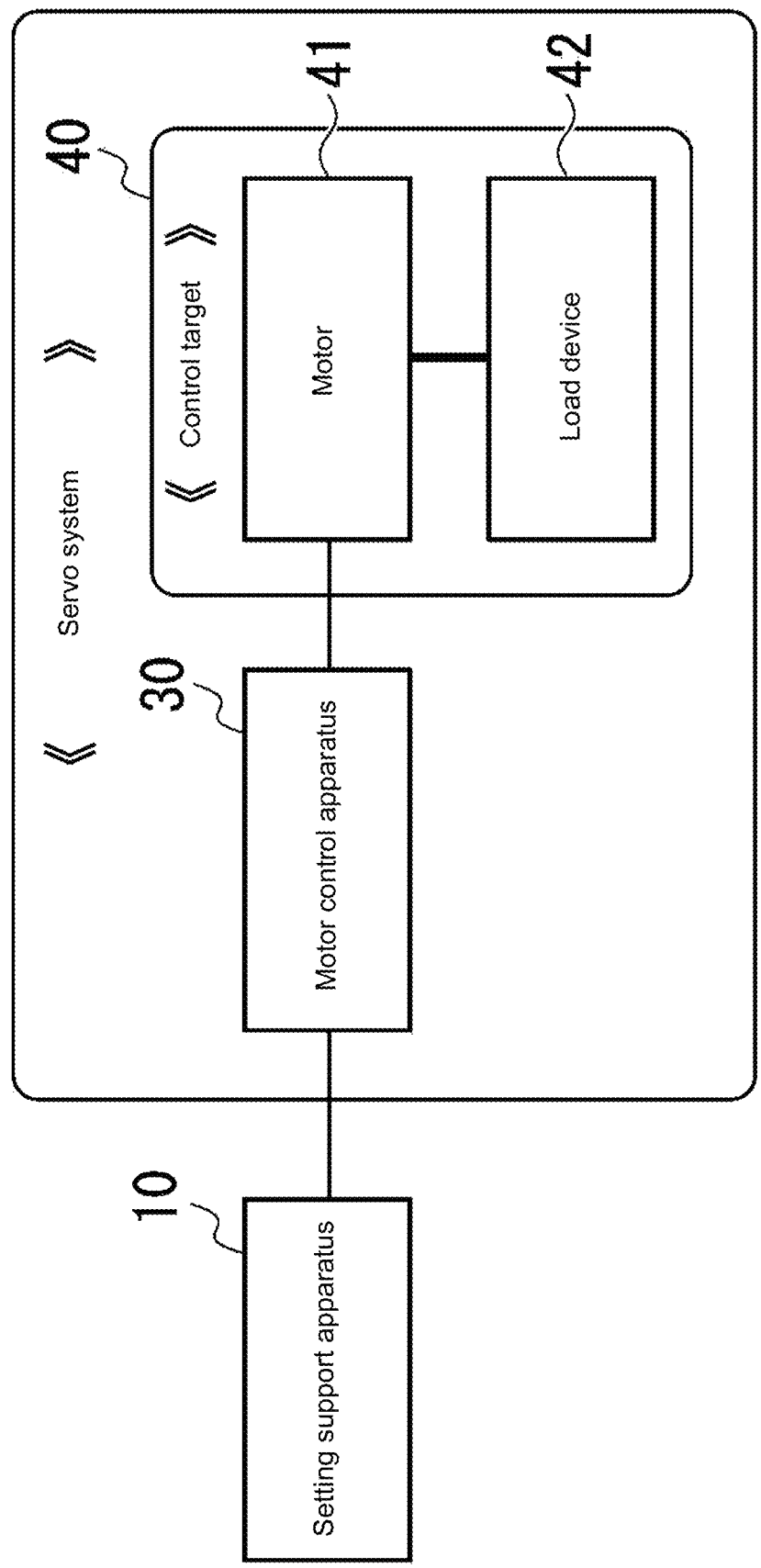
FIG. 1 is a schematic block diagram of a system including a parameter setting support apparatus, a motor control apparatus, and a control target according to one or more embodiments of the present invention.
Figure 2:
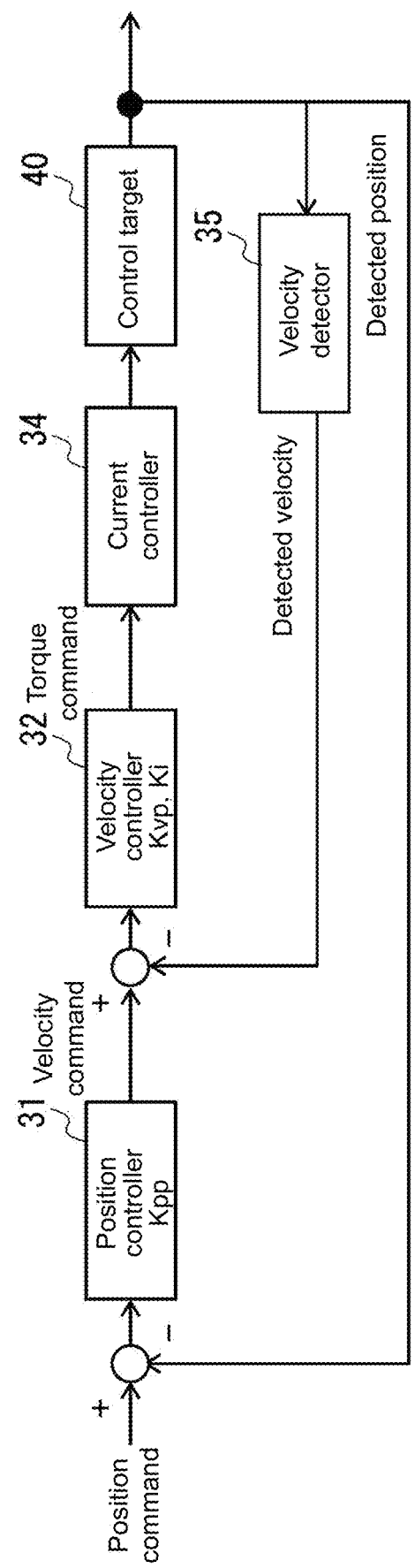
FIG. 2 is a block diagram describing control parameters of a motor control apparatus according to one or more embodiments of the present invention.

Example uses of the present invention will now be described. A parameter setting support apparatus 10 (hereafter simply referred to as a setting support apparatus 10) in example uses of the present invention is applicable to a motor control apparatus 30 that controls a control target 40 including a load device 42 and a motor 41 that drives the load device 42, as shown in FIG. 1. More specifically, the setting support apparatus 10 sets control parameters in the motor control apparatus 30 for controlling the control target 40. FIG. 2 is a block diagram of a feedback control of the control target 40. Examples of the control parameters include a position loop proportional gain Kpp, a velocity loop proportional gain Kvp, and a velocity loop integral gain Ki.

Any known technologies relating to control parameter setting of the motor control apparatus 30 have been developed based on fixed machine parameters of the load device 42. Thus, setting of various control parameters of the motor control apparatus 30 that controls the control target 40 including the load device 42, having machine parameters changeable in accordance with its posture, involves repetition of a series of operations including setting of control parameter values, evaluation, changing of the posture of the load device, and evaluation.

Figure 6:
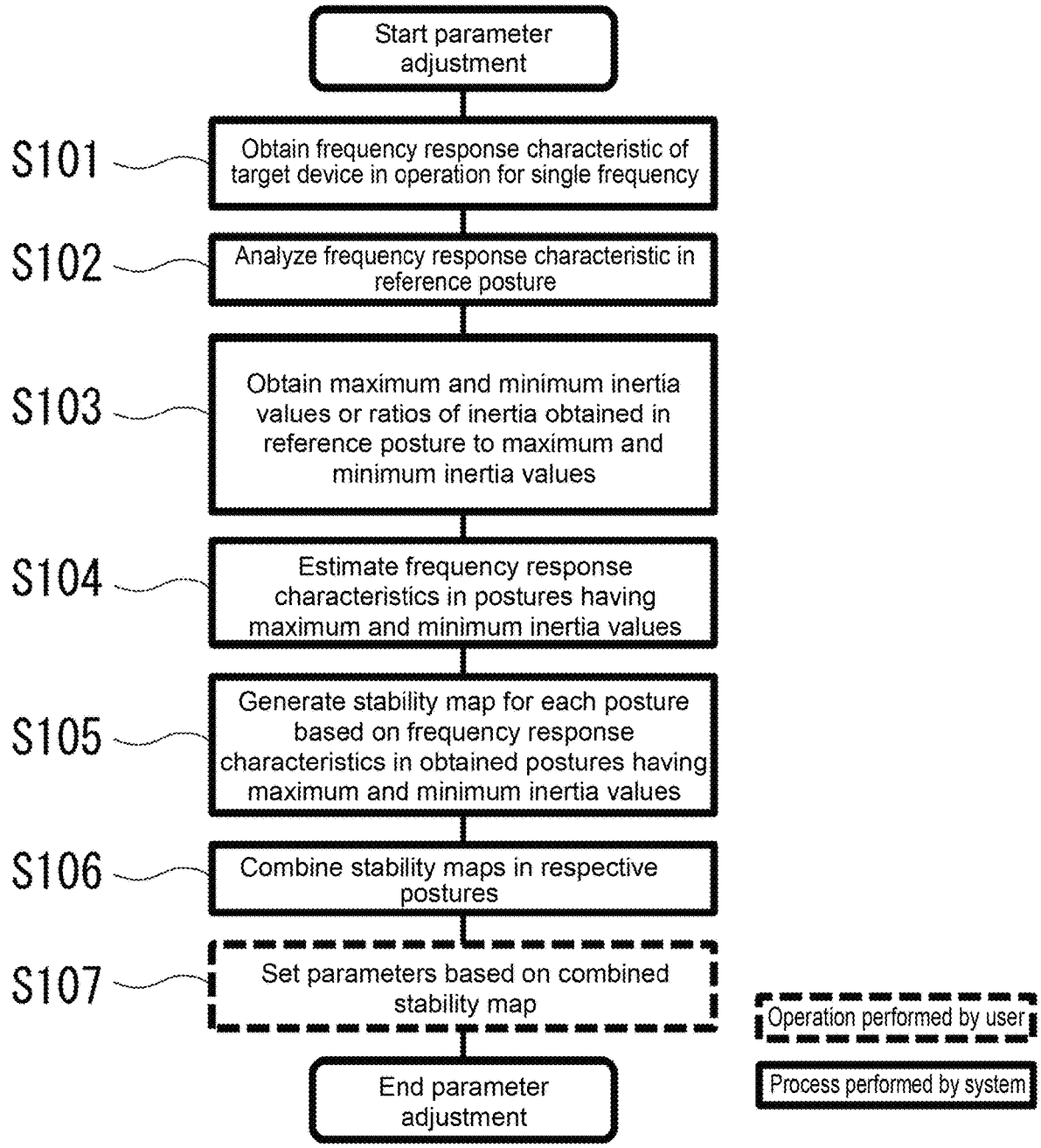
FIG. 6 is a flowchart showing the details of a parameter setting process in one or more embodiments of the present invention.

In the example uses of the present invention, as shown in the parameter setting process in FIG. 6, a frequency response characteristic of the load device 42 in operation for a single frequency is obtained (S101), and the frequency response characteristic in the reference posture of the load device 42 in operation is obtained (S102). Then, maximum and minimum inertia (moment of inertia) values to operate the load device 42 are obtained, or the ratios of the inertia obtained in the reference posture to the maximum and minimum inertia values to operate the load device 42 are obtained (S103) to estimate the frequency response characteristics of the load device 42 in operation in the postures with the maximum and minimum inertia (S104).

Figure 11B:
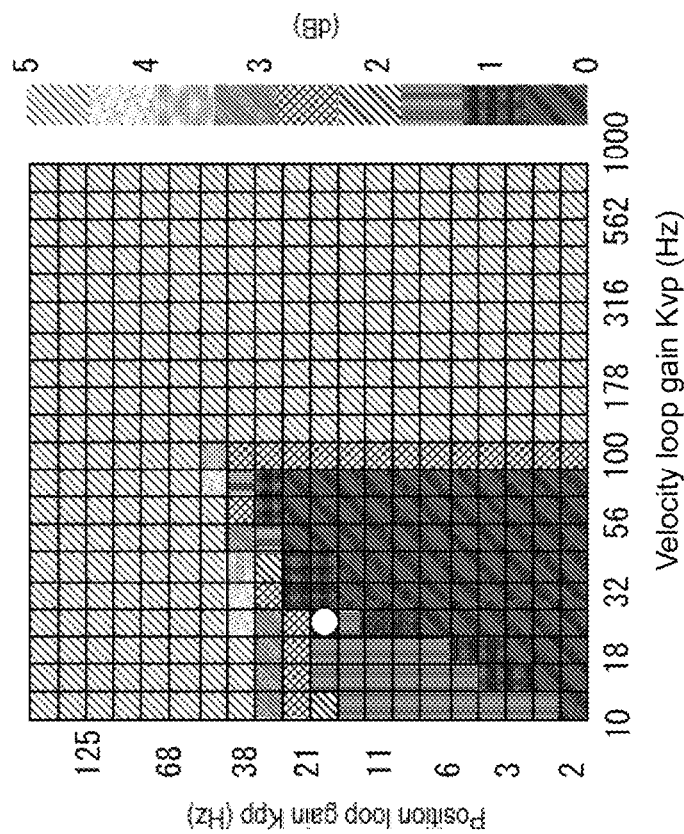
FIGS. 11A and 11B are diagrams showing stability maps for a maximum-inertia posture and a minimum-inertia posture in a first embodiment of the present invention.
Figure 11A:
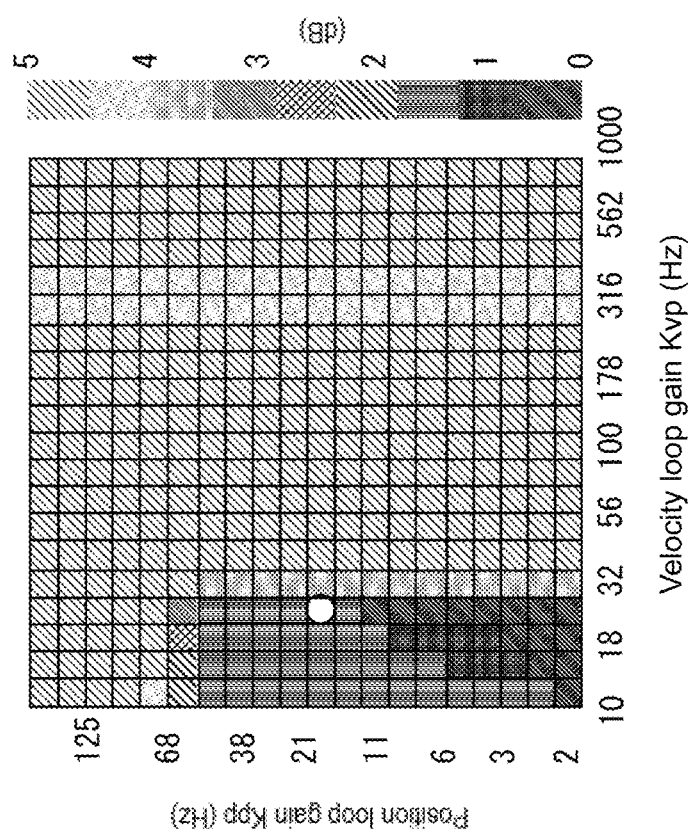
Figure 12:
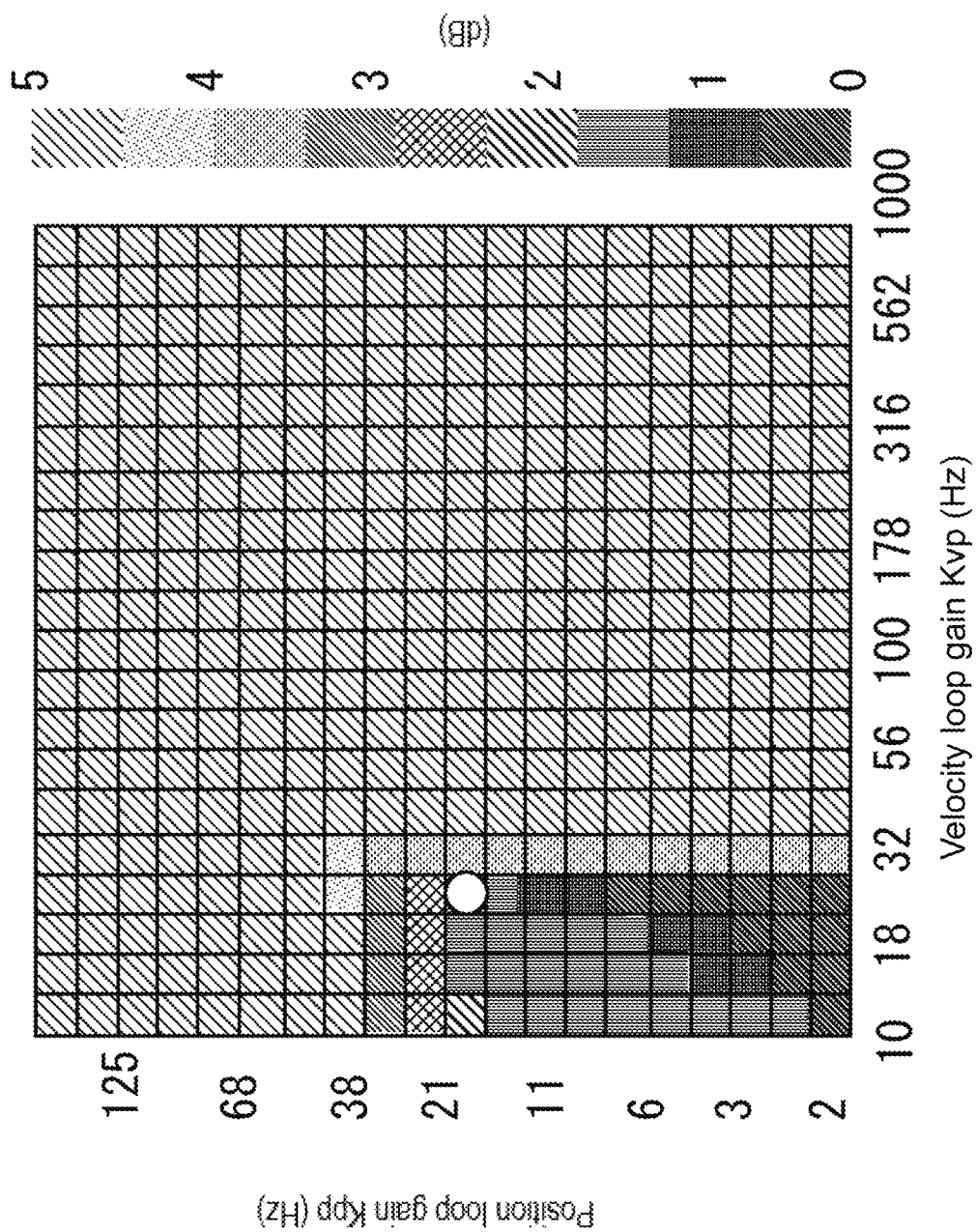
FIG. 12 is a diagram showing a combined stability map in the first embodiment of the present invention.

Based on the frequency response characteristics in the postures with the maximum and minimum inertia, a stability map for each posture is generated (S105), and a combined stability map is generated by combining the stability maps for the respective postures (S106). FIGS. 11A and 11B show example stability maps in the postures with the maximum and minimum inertia. FIG. 12 shows an example combined stability map. With this combined stability map, control parameters for controlling the load device 42 are set (S107) to reduce unstable control due to a change in inertia of the load device 42 in operation, and enables the load device 42 to operate more stably.

An example use of the present invention facilitates setting of control parameters reflecting the change of inertia of the load device 42 in operation based on the frequency response characteristic of the load device 42 in operation for a single frequency and the frequency response characteristic of the load device 42 in the reference posture.

In an example use of the present invention, the stability map shows evaluation index values corresponding to a combination of a vertical axis value and a horizontal axis value, with two different parameters assigned to the vertical axis and the horizontal axis. The parameters assigned to the vertical axis and the horizontal axis are two parameters selected from the velocity loop proportional gain, the velocity loop integral gain, and the position loop proportional gain. The evaluation index values may be indicated with, in addition to different colors or patterns, bars with different lengths (heights) in Z-direction in a three-dimensional stability map.

More specifically, examples of a combination of parameters assigned to the vertical axis and the horizontal axis in the stability map may include three combinations, or a combination of the velocity loop proportional gain and the position loop proportional gain, a combination of the velocity loop proportional gain and the velocity loop integral gain, and a combination of the velocity loop integral gain and the position loop proportional gain.

The combination of control parameters assigned to the vertical axis and the horizontal axis is selected by a user based on the control parameters that are to be adjusted or stabilized. To adjust the control parameters reflecting, for example, a velocity loop and stability, the combination of the velocity loop proportional gain and the position loop proportional gain may be selected. To adjust the parameter of the velocity controller, the combination of the velocity loop proportional gain and the velocity loop integral gain may be selected. The state specified by the combination of the control parameters assigned to the vertical axis and the horizontal axis corresponds to a state of a control apparatus in an aspect of the present invention.

When the combination of the velocity loop proportional gain and the position loop proportional gain or the combination of the velocity loop proportional gain and the velocity loop integral gain as a combination of the parameters assigned to the vertical axis and the horizontal axis is selected, the velocity loop proportional gain is to be used as the horizontal axis. This is because the velocity loop integral gain and the position loop proportional gain have limitations in accordance with the velocity loop proportional gain.

Embodiments of the present invention will now be described in detail with reference to the drawings.

First Embodiment

FIG. 1 is a block diagram of a setting support apparatus 10 according to a first embodiment. The setting support apparatus 10 according to the present embodiment supports a motor control apparatus 30 in setting control parameters. The motor control apparatus 30 controls a motor 41 that drives a load device 42 having machine parameters including the inertia changeable in accordance with its posture or state.

The motor control apparatus 30 controls the motor 41 in accordance with a command (a position command, a torque command, or a velocity command) input from a host device (not shown) such as a programmable logic controller (PLC). A portion including the motor 41 and the load device 42 is hereafter referred to as a control target 40. A portion including the motor control apparatus 30 and the control target 40 is hereafter referred to as a servo system.

In response to an input of a position command from the host device, the motor control apparatus 30 operates as, for example, a position controller 31, a velocity controller 32, a current controller 34, or a velocity detector 35 as shown in FIG. 2. The velocity detector 35 outputs the velocity (hereafter, detected velocity) of the control target 40 by differentiating the position (hereafter, detected position) of the control target 40 detected by an encoder (not shown) attached to the motor 41 or the load device 42.

The position controller 31 has a position loop proportional gain Kpp as a control parameter. As shown in the figure, the position controller 31 receives a position deviation between the position command and the detected position. The position controller 31 calculates a velocity command, or a position deviation multiplied by a position loop proportional gain Kpp, and outputs the velocity command. The velocity controller 32 performs proportional-integral (PI) control using a velocity deviation or a deviation between the velocity command and the detected velocity as a manipulated variable and the torque command as a controlled variable. The velocity controller 32 has a velocity loop proportional gain Kvp and a velocity loop integral gain Ki as control parameters.

The velocity controller 32 includes a torque filter (low-pass filter) and a notch filter that can be turned on and off (switched between operable and inoperable). The torque filter in the velocity controller 32 has a cut-off frequency as a control parameter (hereafter also referred to as a filter parameter). The notch filter in the velocity controller 32 has a center frequency, a notch depth, and a Q factor (=center frequency/notch width) as control parameters (hereafter also referred to as filter parameters). The current controller 34 generates a driving current in response to the torque command from the velocity controller 32 and feeds the current to the motor 41.

Based on the above, the structure and operation of the setting support apparatus 10 will now be described in detail.

Figure 3:
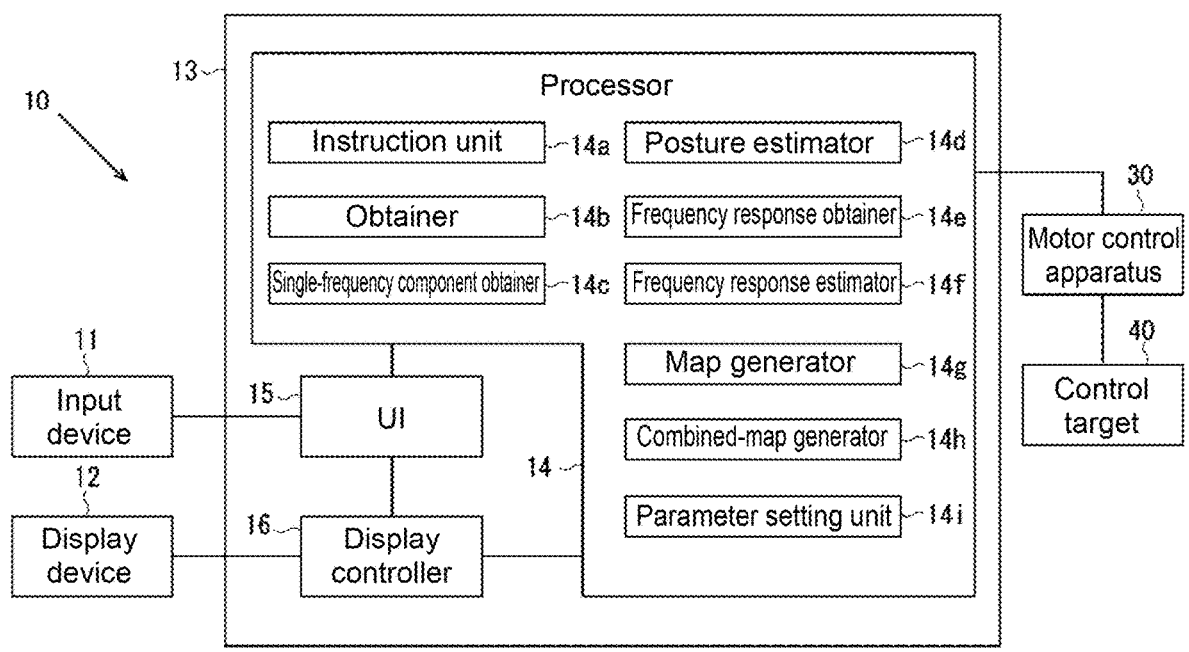
FIG. 3 is a functional block diagram of a parameter setting support apparatus according to one or more embodiments of the present invention.

FIG. 3 is a functional block diagram of the setting support apparatus 10. The setting support apparatus 10 according to the present embodiment is a personal computer (PC) in which a setting support program is installed. As shown in FIG. 3, the setting support program installed in the PC causes a body (or a portion including a central processing unit (CPU) and peripheral devices) 13 of the PC to function as a processor 14, a user interface (UI) 15, and a display controller 16.

The display controller 16 is a functional block that displays images indicated by the processor 14 or the UI 15 on a screen of a display device 12. The UI 15 is a functional block that enables a user to operate an input device 11 including a mouse and a keyboard to designate the type of processes to be performed by the processor 14 and process conditions under which the process is to be performed, and causes the processor 14 to perform the process designated by a user under the process conditions designated by the user. The processor 14 is a functional block that can perform a parameter setting process (described later) and other processes. The processor 14 includes an instruction unit 14a, an obtainer 14b, a single-frequency component obtainer 14c, a specific-inertia posture estimator 14d, a frequency response obtainer 14e, a frequency response estimator 14f, a map generator 14g, a combined-map generator 14h, and a parameter setting unit 14i.

The instruction unit 14a in the processor 14 provides instructions about the movement and posture of the load device 42 to the motor control apparatus 30.

The obtainer 14b obtains a signal corresponding to the measured current position of the load device 42 from the motor control apparatus 30. Instead of a signal corresponding to the current position, the signal obtained by the obtainer 14b may be a signal corresponding to the current velocity or current torque.

The single-frequency component obtainer 14c generates a command signal relating to a position command for controlling the load device 42, and causes the instruction unit 14a to provide the command signal to the motor control apparatus 30. Based on a signal measured in response to the command signal and obtained by the obtainer 14b, the single-frequency component obtainer 14c obtains a gain or a phase shift amount for a predetermined single frequency. Instead of the position command, the command signal may be a velocity command or a torque command.

The specific-inertia posture estimator 14d causes the instruction unit 14a to instruct the motor control apparatus 30 to implement a series of postures formed during the movement of the load device 42 in operation, causes the single-frequency component obtainer 14c to obtain a gain or a phase shift amount for the predetermined single frequency in each posture, and estimates postures with the maximum and minimum inertia based on the gain in each posture.

The frequency response obtainer 14e causes the instruction unit 14a to instruct the motor control apparatus 30 to vibrate the load device 42 in a predetermined frequency range in the reference posture selected from the series of postures, and obtains the frequency response characteristic in the reference posture from the signal obtained by the obtainer 14b. The frequency response estimator 14f estimates the frequency response characteristics of the gain in the postures with the inertia estimated as being maximum and minimum based on the frequency response characteristic in the reference posture obtained by the frequency response obtainer 14e and the gain or the phase shift amount for the above single frequency in each posture obtained by the single-frequency component obtainer 14c.

The map generator 14g generates, based on the frequency response characteristics estimated by the frequency response estimator 14f, a maximum inertia stability map in the posture with the maximum inertia, and a minimum inertia stability map in the posture with the minimum inertia. The combined-map generator 14h generates a combined stability map by combining the maximum inertia stability map and the minimum inertia stability map. The parameter setting unit 14i displays the combined stability map, receives designation of the position on the combined stability map, and sets control parameters based on the vertical axis value and the horizontal axis value of the designated position.

Figure 4:
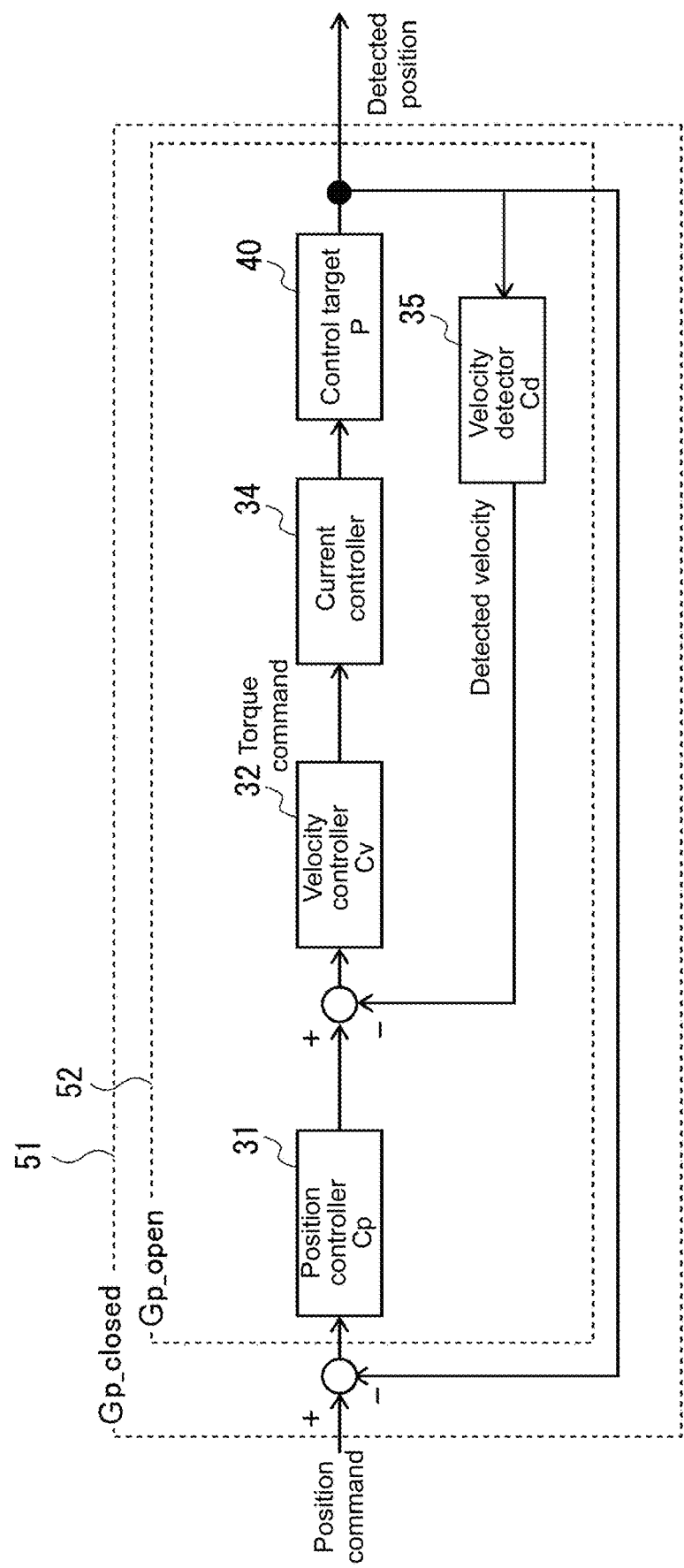
FIG. 4 is a diagram describing a position closed-loop characteristic Gp_closed and a position open-loop characteristic Gp_open in one or more embodiments of the present invention.
Figure 5:
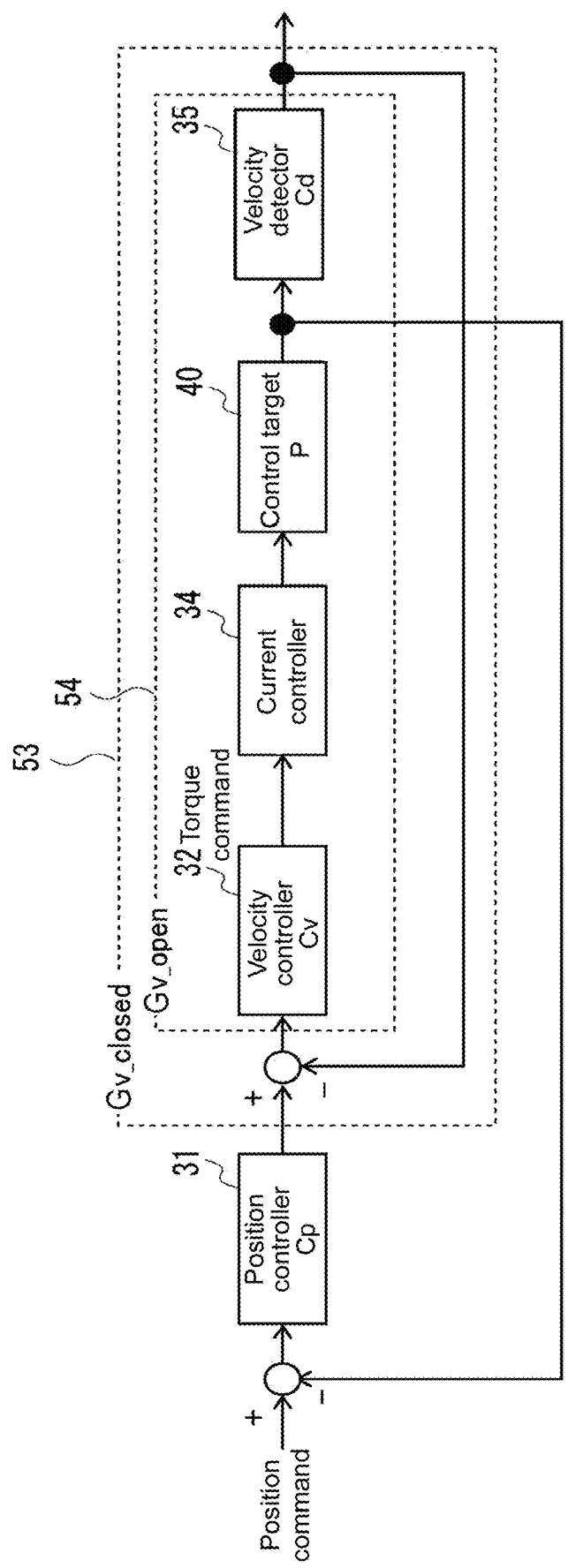
FIG. 5 is a diagram describing a velocity closed-loop characteristic Gv_closed and a velocity open-loop characteristic Gv_open in one or more embodiments of the present invention.

Each process will now be described sequentially. In each process described below, the posture or state of the load device 42 will be simply referred to as the posture of the load device 42. A position closed-loop characteristic Gp_closed and a position open-loop characteristic Gp_open hereafter correspond to the frequency transfer functions of respective portions in the servo system enclosed in dotted frames 51 and 52 in FIG. 4. A velocity closed-loop characteristic Gv_closed and a velocity open-loop characteristic Gv_open hereafter correspond to the frequency transfer functions of respective portions in the servo system enclosed in dotted frames 53 and 54 in FIG. 5.

Parameter Setting Process

FIG. 6 is a flowchart showing the details of the parameter setting process in the present embodiment. This process is a program stored in a memory (not shown) included in the body 13 of the PC and is performed by the processor 14 in response to an input of a processing start command from a user through the input device 11.

When the process is started, first in step S101, the single-frequency component obtainer 14c obtains a frequency response characteristic of the control target 40 in operation for a single frequency. More specifically, in response to an instruction from the instruction unit 14a, the obtainer 14b obtains a frequency response characteristic (gain characteristic) for an input of a specific frequency while the motor 41 is operating the load device 42 for repeated measurement in real time.

Figure 7:
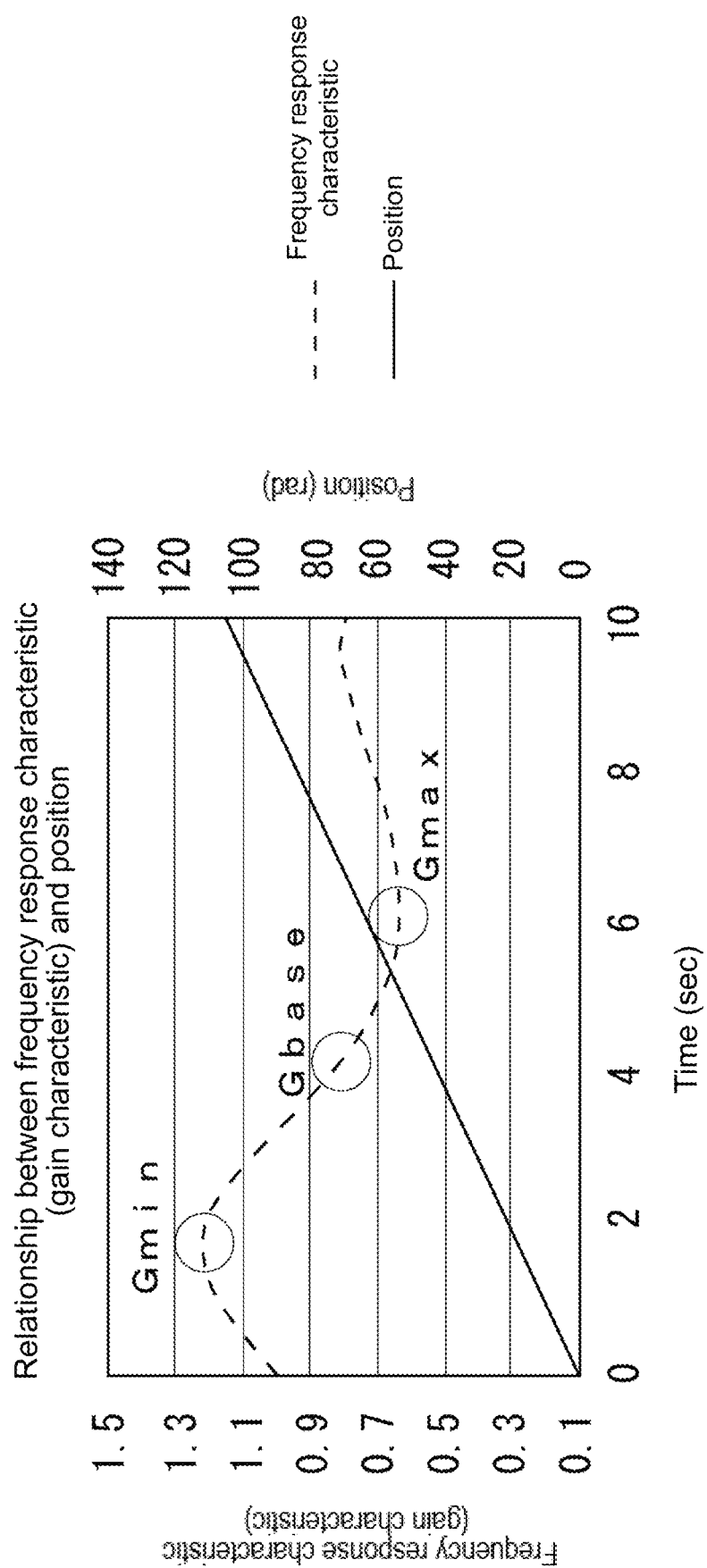
FIG. 7 is a graph showing the relationship between the position of a load device and time and the relationship between a frequency response characteristic (gain characteristic) for an input of a specific frequency and time in one or more embodiments of the present invention.

FIG. 7 shows an example of the relationship in this case between the position of the load device 42 and time and the relationship between the frequency response characteristic (gain characteristic) and time. In FIG. 7, the horizontal axis indicates time, and the vertical axis indicates the position (rad) of the load device 42 and the frequency response characteristic (gain characteristic). As shown in FIG. 7, the frequency response characteristic (gain characteristic) changes based on the position of the load device 42. The processing in step S101 corresponds to a single-frequency response obtaining step in an aspect of the present invention. After step S101, the processing advances to step S102.

Figure 8:
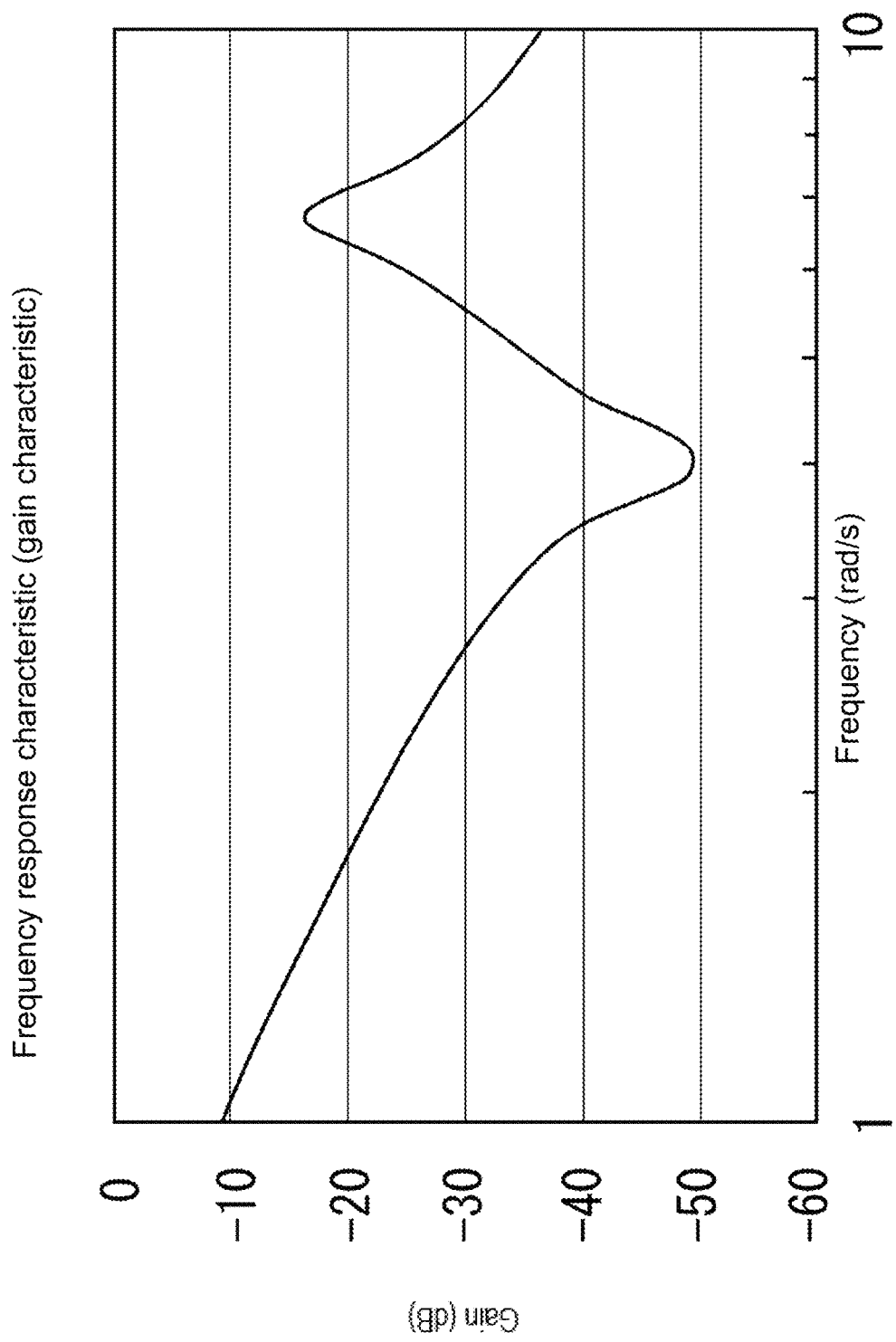
FIG. 8 is an example graph showing a frequency response characteristic in a reference posture in one or more embodiments of the present invention.

In step S102, the predefined frequency response obtainer 14e performs frequency response analysis of the load device 42 in the reference posture. FIG. 8 shows an example frequency response characteristic in the reference posture. More specifically, the frequency response obtainer 14e measures the response characteristic in the reference posture while changing the frequency. The processing in step S102 corresponds to a reference frequency response obtaining step in an aspect of the present invention. After step S102, the processing advances to step S103.

In step S103, the processor 14 obtains maximum and minimum inertia values for operating the load device 42, or obtains a ratio of the inertia obtained in the reference posture to the maximum and minimum inertia values for operating the load device 42.

A process for directly obtaining maximum and minimum inertia values will be described first. In this process, inertia J is calculated based on the frequency response characteristic (corresponding to the graph in FIG. 7) for the single frequency measured in S101, and formula (1) below expressing the relationship between the frequency response characteristic (gain characteristic) and the inertia values.

$$\text{inertia } J = (Kvp \cdot J_0)/(\omega \cdot |G(j\omega)|) \quad (1)$$

Figure 9:
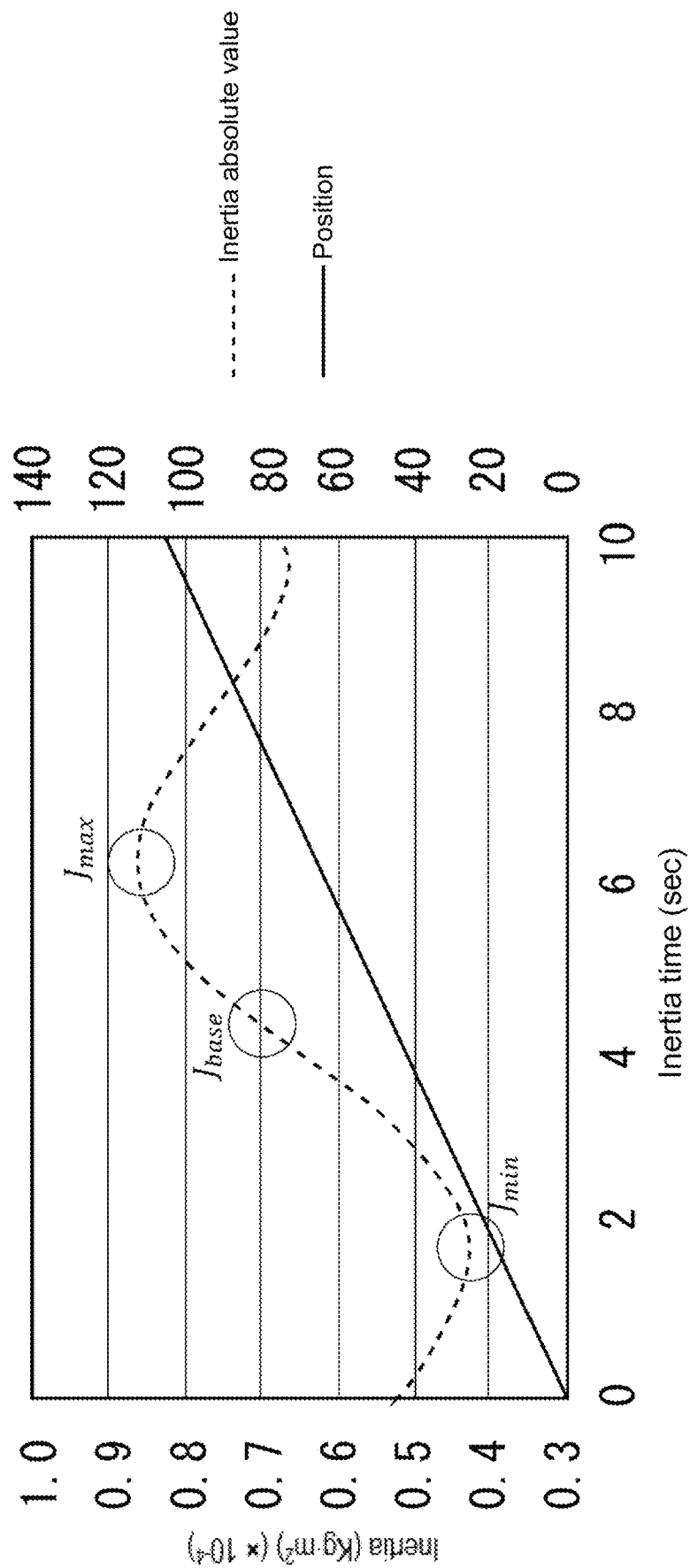
FIG. 9 is a graph showing the relationship between the position of a load device and time and the relationship between inertia values of the load device and time in one or more embodiments of the present invention.

In this formula, Kvp is a velocity loop proportional gain and $J_0$ is a set inertia value determined in advance. FIG. 9 is a graph showing the relationship between time and the inertia values calculated above. The graph shown in FIG. 9 enables calculation of a reference posture inertia value Jbase, which is an inertia value in the reference posture, a maximum inertia value Jmax, and a minimum inertia value Jmin using the formulas below.

reference posture inertia value Jbase=0.70×10$^{-4}$ (kg·m$^2$)
maximum inertia value Jmax=0.87×10$^{-4}$ (kg·m$^2$)
minimum inertia value Jmin=0.43×10$^{-4}$ (kg·m$^2$)

In FIG. 9, the postures with the maximum and minimum inertia are estimated by the specific-inertia posture estimator 14d.

An operation of obtaining a ratio of the inertia obtained in the reference posture to the maximum and minimum inertia values will now be described. Based on the relationship between the position of the load device 42 and time and the relationship between the frequency response characteristic (gain characteristic) and time shown in FIG. 7, a maximum-inertia-posture gain characteristic value Gmax, a minimum-inertia-posture gain characteristic value Gmin, and a reference posture gain characteristic value Gbase are obtained using the formulas below.

maximum-inertia-posture gain characteristic value Gmax=0.60
minimum-inertia-posture gain characteristic value Gmin=1.22
reference posture gain characteristic value Gbase=0.75

The inertia values (described above) in the reference posture will now be described (the reference posture is preset at the position at which the reference posture inertia value Jbase is determined).

reference posture inertia value Jbase=0.70×10$^{-4}$ (kg·m$^2$).

The ratios of the inertia values obtained in the reference posture to the maximum and minimum inertia values are calculated as follows using the above ratios of the gain characteristics.

maximum inertia ratio Jmax_ratio=Gbase/Gmax≈1.25
minimum inertia ratio Jmin_ratio=Gbase/Gmin≈0.61

Based on the obtained maximum inertia ratio Jmax_ratio and minimum inertia ratio Jmin_ratio, the maximum and minimum inertia values, the frequency response characteristic in the maximum-inertia posture, and the frequency response characteristic in the minimum-inertia posture are estimated.

The maximum inertia value and the minimum inertia value are obtained using the formulas below.

maximum inertia value Jmax=Jbase×Jmax_ratio=0.87× 10$^{-4}$ (kg·m$^2$)
minimum inertia value Jmin=Jbase×Jmin_ratio=0.43× 10$^{-4}$ (kg·m$^2$)

After step S103, the processing advances to step S104. The processing in step S103 corresponds to a specific-inertia-value obtaining step in an aspect of the present invention.

Figure 10:
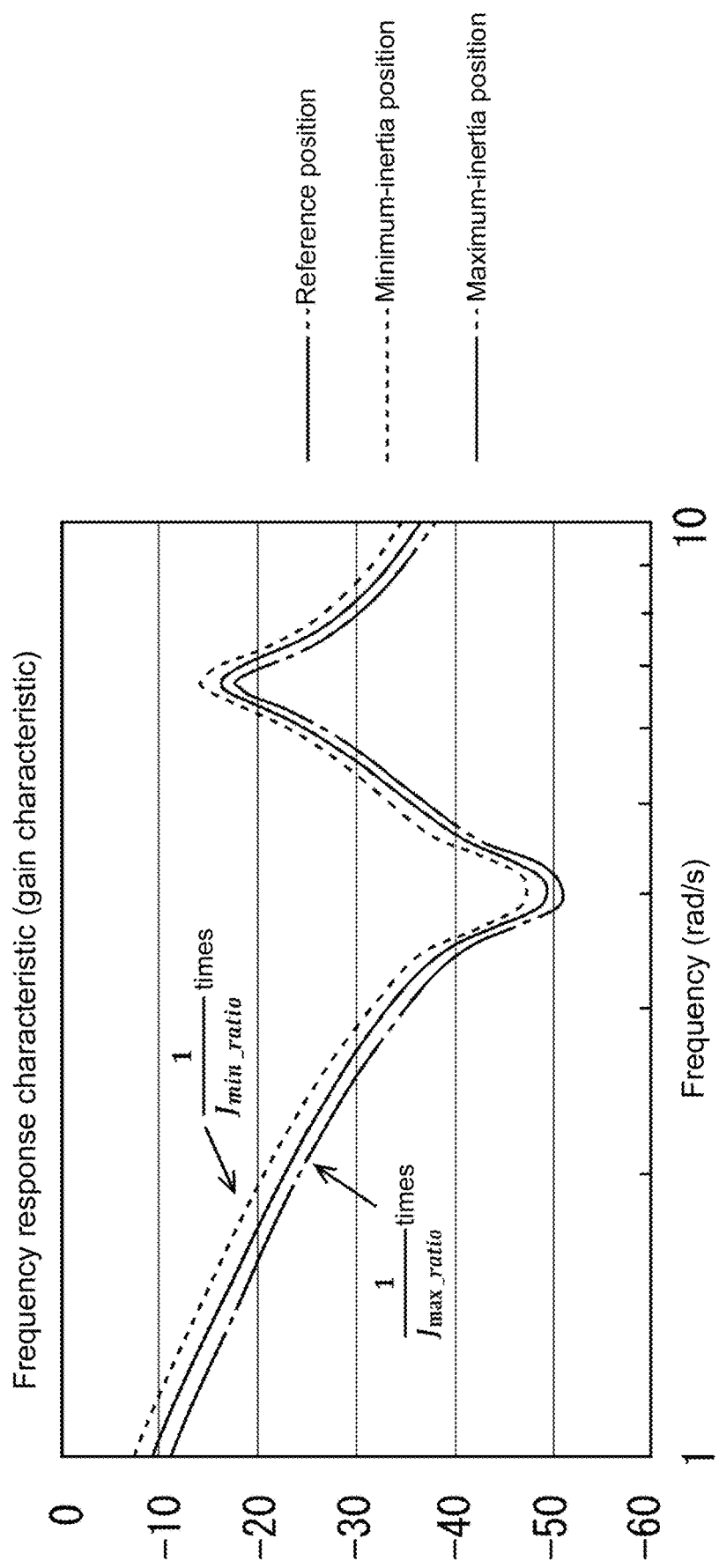
FIG. 10 is a graph showing a frequency response characteristic at a reference position, a position at which inertia is minimum, and a position at which inertia is maximum estimated in one or more embodiments of the present invention.

In step S104, the gain value of the frequency response characteristic in the reference posture obtained in step S102 is divided by the maximum inertia ratio Jmax_ratio and the minimum inertia ratio Jmin_ratio to estimate, with the frequency response estimator 14$f$, the frequency response characteristics at the reference position, the minimum-inertia position, and the maximum-inertia position as shown in FIG. 10. This processing in step S104 corresponds to a frequency response characteristics estimation step in an aspect of the present invention. After step S104, the processing advances to step S105.

In step S105, the map generator 14$g$ generates a stability map in each posture based on the frequency response characteristics in the maximum-inertia posture and the minimum-inertia posture obtained in step S104. This stability map shows evaluation index values indicating the system stability in different colors with the velocity loop proportional gain Kvp shown on the horizontal axis and the position loop proportional gain Kpp on the vertical axis.

A method for calculating the evaluation index values will now be described in detail. The processor 14 controls the motor control apparatus 30 to measure the position closed-loop characteristic Gp_closed (an array of complex numbers). This process may be either a process involving calculation of the position closed-loop characteristic Gp_closed by cyclically collecting detected positions while inputting, into the motor control apparatus 30, position commands that change with time to include many frequency components and by applying a Fourier transform to the input position commands and the collected detected positions to calculate a ratio, or a process involving requesting the motor control apparatus 30 to measure the position closed-loop characteristic Gp_closed and obtaining the measurement result from the motor control apparatus 30.

The processor 14 calculates a control target characteristic P (frequency transfer function P of the control target 40) using the measurement result. More specifically, the processor 14 specifies a characteristic (frequency transfer function; the same applies hereafter) Cp of the position controller 31 and characteristic Cv of the velocity controller 32 from set values of various parameters (Kpp, Kvp, Ki, and filter parameters) at that time (time when Gv_closed is measured). The processor 14 calculates the control target characteristic P based on the specified characteristics Cp and Cv, the characteristic Cd of the velocity detector 35, and Gv_closed (refer to FIG. 5).

Subsequently, the processor 14 calculates the evaluation index values for the multiple device-set states based on the control target characteristic P. More specifically, the processor 14 repeats, for each device-set state, the processing involving specifying the characteristics (characteristic Cp of the position controller 31 and characteristic Cv of the velocity controller 32) of each component in the device-set state, calculating Gp_closed from the specified characteristics of each component, the characteristic Cd, and the control target characteristic P, and calculating the evaluation index value based on the calculated Gp_closed.

The multiple states of the control apparatus herein have different combinations of the position loop proportional gain Kpp and the velocity loop proportional gain Kvp, and have the velocity loop integral gain Ki obtained by multiplying the velocity loop proportional gain Kvp by ¼, the cut-off frequency of a torque filter obtained by multiplying the velocity loop proportional gain Kvp by 6.8, and the filter parameter value of the notch filter corresponding to the value at the start of a first setting support process. A position closed-loop gain peak value is used as an example of the evaluation index value in the present embodiment. However, the evaluation index value in the present invention is not limited to this. For example, the evaluation index value may be a velocity closed-loop gain peak value, a position open-loop gain margin, a position open-loop phase margin, a velocity open-loop gain margin, a velocity open-loop phase margin, or a value calculated based on one or more of these values and margins.

In the present embodiment, the position closed-loop gain peak value is used as the evaluation index value as described above. FIGS. 11A and 11B show example stability maps according to the present embodiment. FIG. 11A shows an example of the stability map in the maximum-inertia posture. FIG. 11B shows an example of the stability map in the minimum-inertia posture. The processor 14 that performs the processing in step S105 corresponds to a first specifier in an aspect of the present invention. The processing in step S105 corresponds to a stability map generating step in an aspect of the present invention. After step S105, the processing advances to S106.

In step S106, the combined-map generator 14$h$ combines the stability map in the maximum-inertia posture and the stability map in the minimum-inertia posture to generate a combined stability map indicating the stability of a control target having its inertia that is changeable. More specifically, the combined stability map shows, in different colors, a lower evaluation index value of the evaluation indexes in the stability map among the evaluation index in the maximum-inertia posture and the evaluation index in the minimum-inertia posture with the velocity loop proportional gain Kvp on the horizontal axis and the position loop proportional gain Kpp on the vertical axis.

The lower evaluation index value corresponds to a combined evaluation index value in an aspect of the present invention. FIG. 12 shows a combined stability map in the present embodiment. The portion marked with a white circle in each stability map represents recommendation values (described later) for Kpp and Kvp. The processor 14 that performs the processing in step S106 corresponds to a second specifier in an aspect of the present invention. The processing in step S106 corresponds to a combined stability map generating step in an aspect of the present invention.

After step S106, the processing advances to step S107. In step S107, the parameter setting unit 14*i* determines the values of the position loop proportional gain Kpp and the velocity loop proportional gain Kvp based on the combined stability map. More specifically, in this embodiment, the parameter setting unit 14*i* uses the recommendation values for the position loop proportional gain Kpp and the velocity loop proportional gain Kvp shown on the combined stability map. The processing in step S107 corresponds to a parameter setting step in an aspect of the present invention. After step S107, the routine ends.

In the present embodiment, as described above, the stability maps in the maximum-inertia posture and the minimum-inertia posture are generated by changing the posture of the load device 42 having its inertia changeable while the device is in operation. The control parameters (the position loop proportional gain Kpp and the velocity loop proportional gain Kvp) are then determined based on the combined stability map obtained by combining these stability maps. This enables more reliable selection of control parameter values that enable a stable operation independently of when a load device included in a control target has its inertia changeable while the device is in operation.

First Modification

In the present embodiment described above, the reference posture is set to differ from the maximum-inertia posture and the minimum-inertia posture, but the minimum-inertia posture may be set as the reference posture in the above embodiment.

Figure 13:
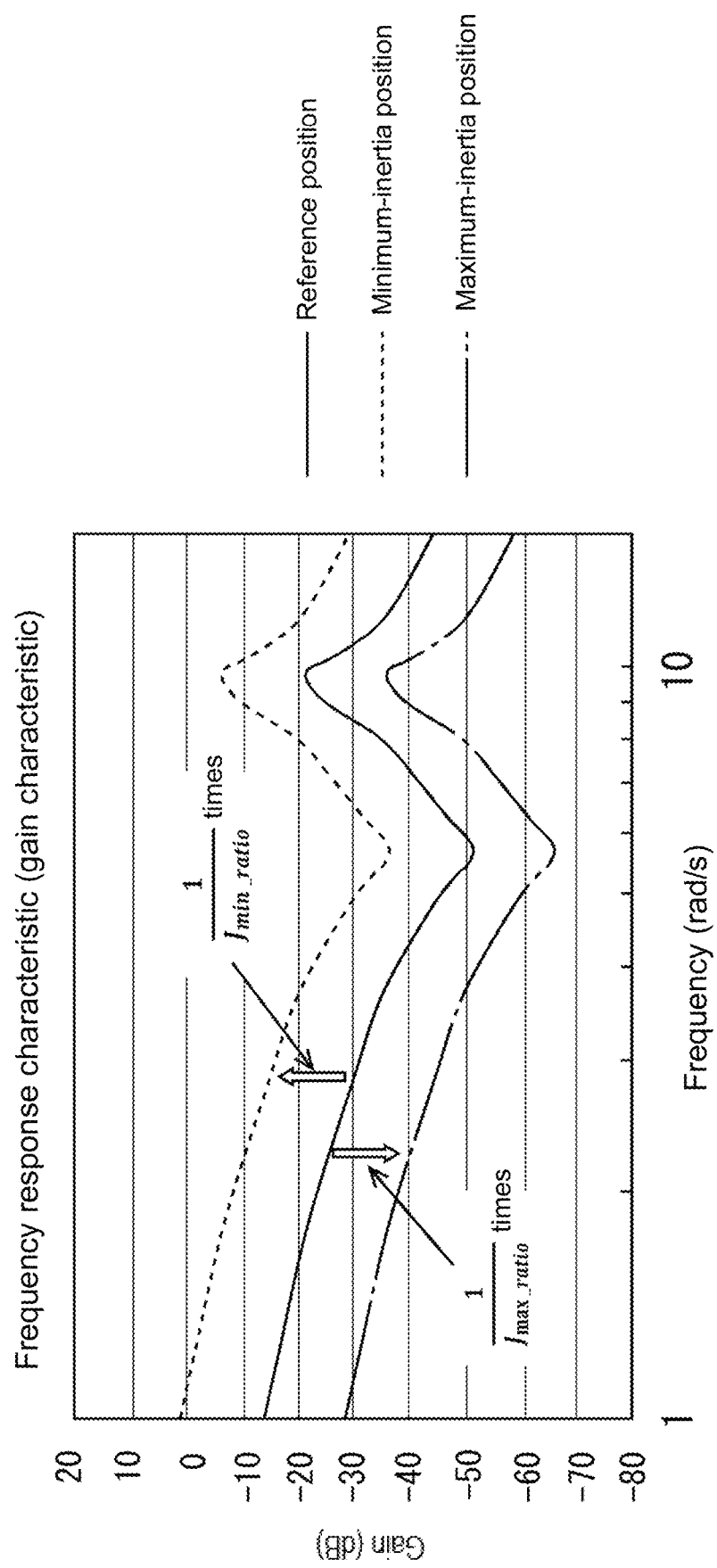
FIG. 13 is a graph showing a frequency response characteristic at a reference position, a position at which inertia is minimum, and a position at which inertia is maximum estimated in the first embodiment of the present invention.
Figure 14:
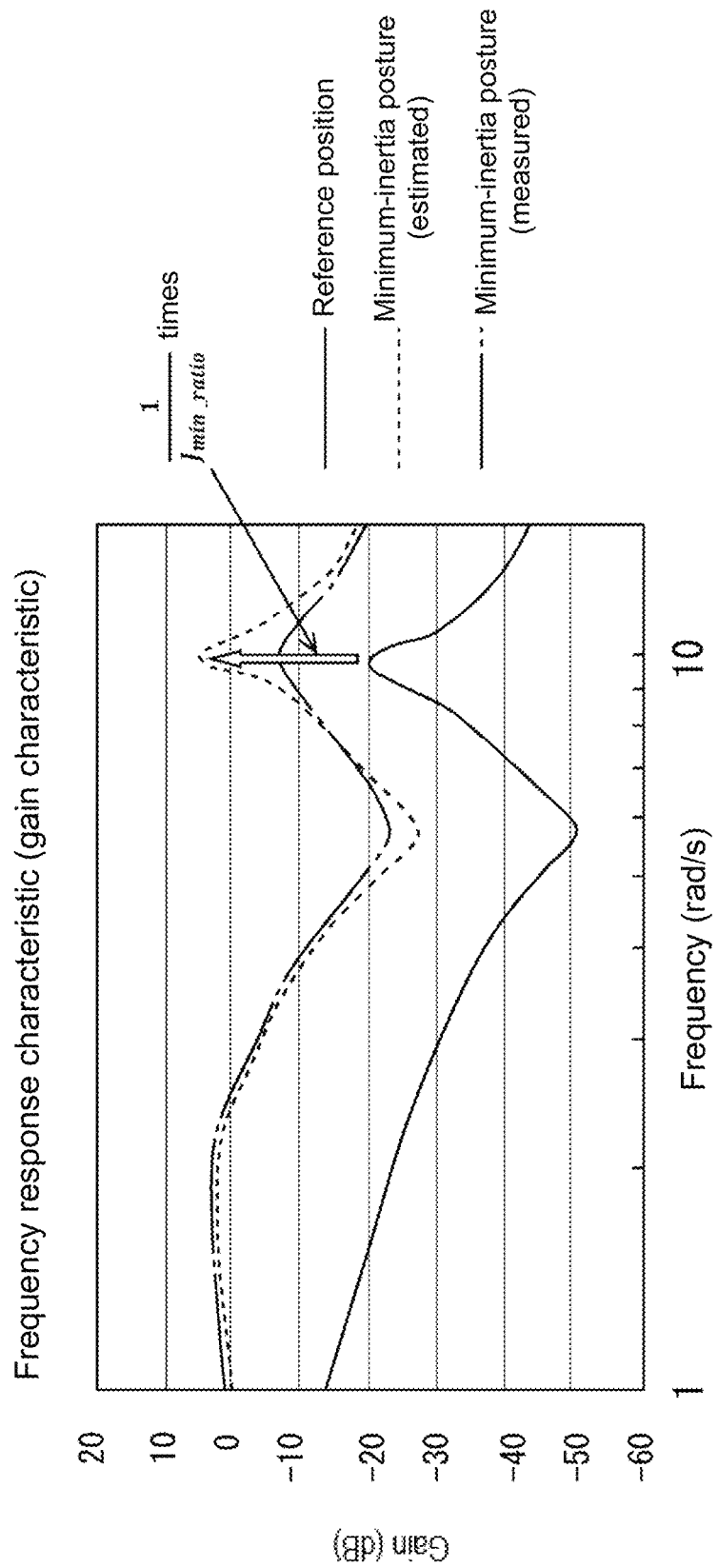
FIG. 14 is a graph showing a frequency response characteristic in a minimum-inertia posture estimated by dividing a frequency response characteristic obtained in a reference posture by a minimum inertia ratio in the first embodiment of the present invention.

As shown in FIG. 13, the frequency response characteristic in the minimum-inertia posture is obtained by (as in the first embodiment) dividing each gain value of the frequency response characteristic in the reference posture by the minimum inertia ratio Jmin_ratio, and is thus expected to be the highest frequency response characteristic of those in the reference posture, the maximum-inertia posture, and the minimum-inertia posture. Thus, when the frequency response characteristic in the minimum-inertia posture is estimated by setting the reference posture to differ from the maximum-inertia posture or the minimum-inertia posture, and dividing the frequency response characteristic obtained in the reference posture by the minimum inertia ratio min_ratio, as shown in FIG. 14, a strict frequency response characteristic in the minimum-inertia posture cannot be obtained, and the control stability may be lowered.

Figure 15:
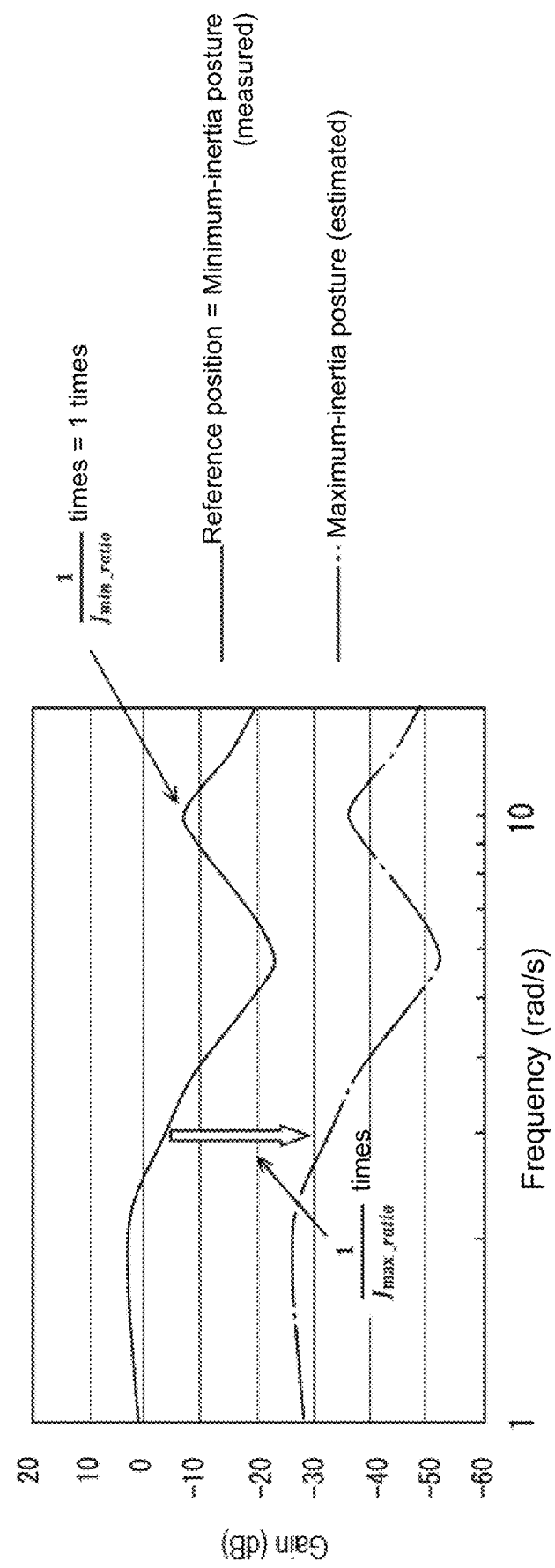
FIG. 15 is a graph showing a frequency response characteristic in a maximum-inertia posture estimated by dividing a frequency response characteristic obtained in a reference posture by a maximum inertia ratio in the first embodiment of the present invention when the reference posture is determined as a minimum-inertia posture.

In the present modification, the minimum-inertia posture is set as the reference position, and the frequency response characteristic in the minimum-inertia posture is measured as shown in FIG. 15. This operation can improve the accuracy of the obtained frequency response characteristic in the minimum-inertia posture and improve the control stability in the minimum-inertia posture. As shown in FIG. 15, the frequency response characteristic in the maximum-inertia posture has the gain shifted to be lower by dividing the frequency response characteristic in the reference posture by the maximum inertia ratio max_ratio. Thus, the frequency response characteristic in the maximum-inertia posture can be more stable.

Second Modification

A second modification of the present invention will now be described. In the first embodiment, the frequency response characteristic in the reference posture is obtained, and the frequency response characteristic in the reference posture is divided by the minimum inertia ratio min_ratio to obtain the frequency response characteristic in the minimum-inertia posture. The frequency response characteristic in the reference posture is divided by the maximum inertia ratio max_ratio to obtain the frequency response characteristic in the maximum-inertia posture. In some embodiments, in addition to the reference posture, the frequency response characteristic in the minimum-inertia posture and the maximum-inertia posture may also be measured.

Figure 16:
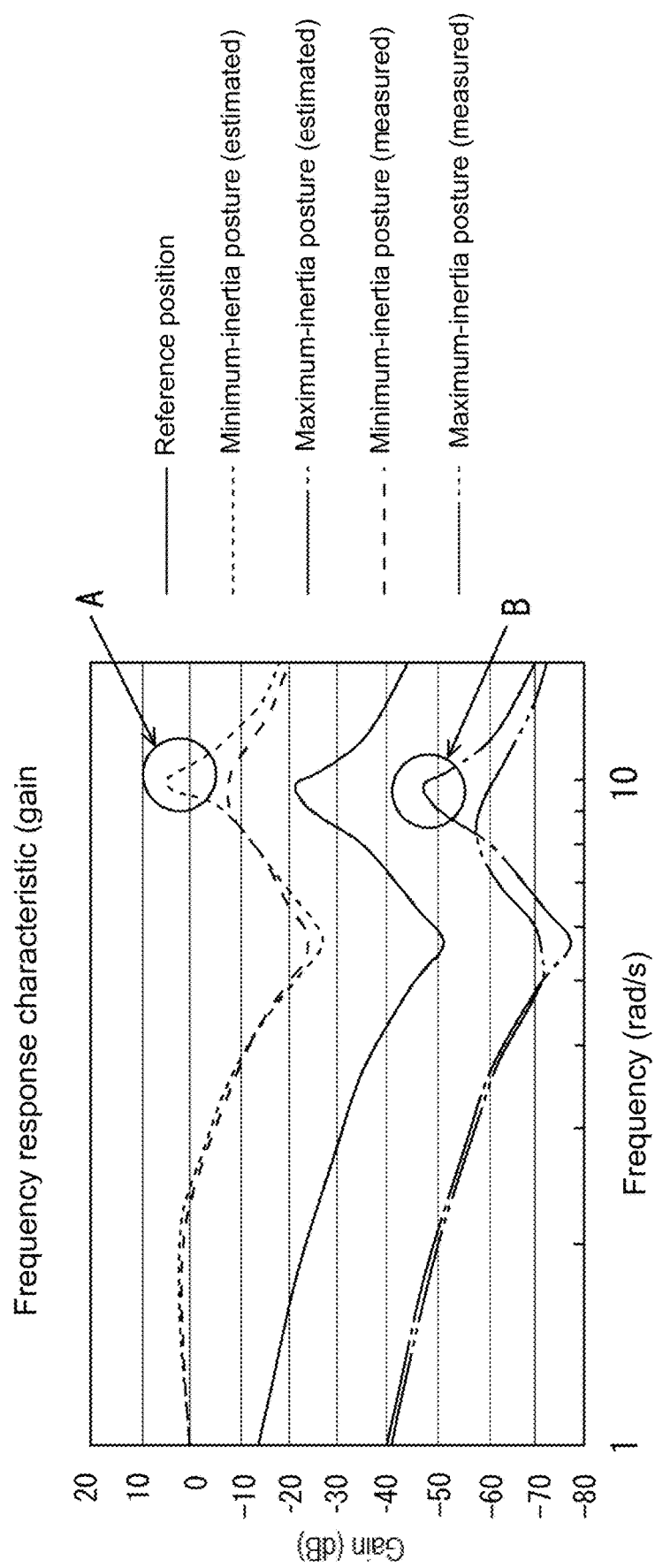
FIG. 16 is a graph showing estimated values and actual values of the frequency response characteristics in the minimum-inertia posture and the maximum-inertia posture in the first embodiment of the present invention.

FIG. 16 shows the frequency response characteristic in the reference posture, the minimum-inertia posture, and the maximum-inertia posture in the second modification. For the minimum-inertia posture and the maximum-inertia posture, estimated values and measured values are plotted. As shown in FIG. 16, when the frequency response characteristic in the minimum-inertia posture is estimated by dividing the frequency response characteristic in the reference posture by the minimum inertia ratio min_ratio, the gain peak is estimated as exceeding 0 dB although the measured gain peak falls below 0 dB, and this estimation may involve lowering of the gain.

Also, when the frequency response characteristic in the maximum-inertia posture is estimated by dividing the frequency response characteristic in the reference posture by the maximum inertia ratio max_ratio, the gain peak is estimated as a value exceeding an actual measurement although an actual gain can be higher but this estimation may disable setting of a higher gain.

In contrast, as shown in the present modification, measuring the frequency response characteristics also in the maximum-inertia posture and the minimum-inertia posture enables more accurate frequency response characteristics to be obtained in both postures, thus enabling more efficient selection of optimum control parameters.

Second Embodiment

A second embodiment of the present invention will now be described. In the example described in the first embodiment, the frequency response characteristic for a single frequency is calculated during the operation of the load device, and the inertia values are calculated based on the characteristic. In an example described below in the present embodiment, a sinusoidal signal is superimposed on an operation command directed to the load device.

In the first embodiment, as described above, the frequency response characteristic for a single frequency is calculated during the operation of the load device 42, and the inertia values are calculated based on the characteristic. More specifically, for example, the load device 42 is unidirectionally operated and the frequency response characteristic for a single frequency (gain characteristic) is repeatedly checked in real time to calculate the inertia values of the load device 42.

Obtaining the frequency response characteristic for a single frequency involves a frequency signal. When an operation command directed to the load device 42 is, for example, a uniform motion command, the operation command does not include a frequency signal, and this may cause difficulty in obtaining the frequency response characteristic for a single frequency. In some embodiments, when an operation command includes multiple frequency components, the load device may fail to correctly obtain the frequency response characteristic for a single frequency, as being affected by the multiple frequency components.

Figure 17:
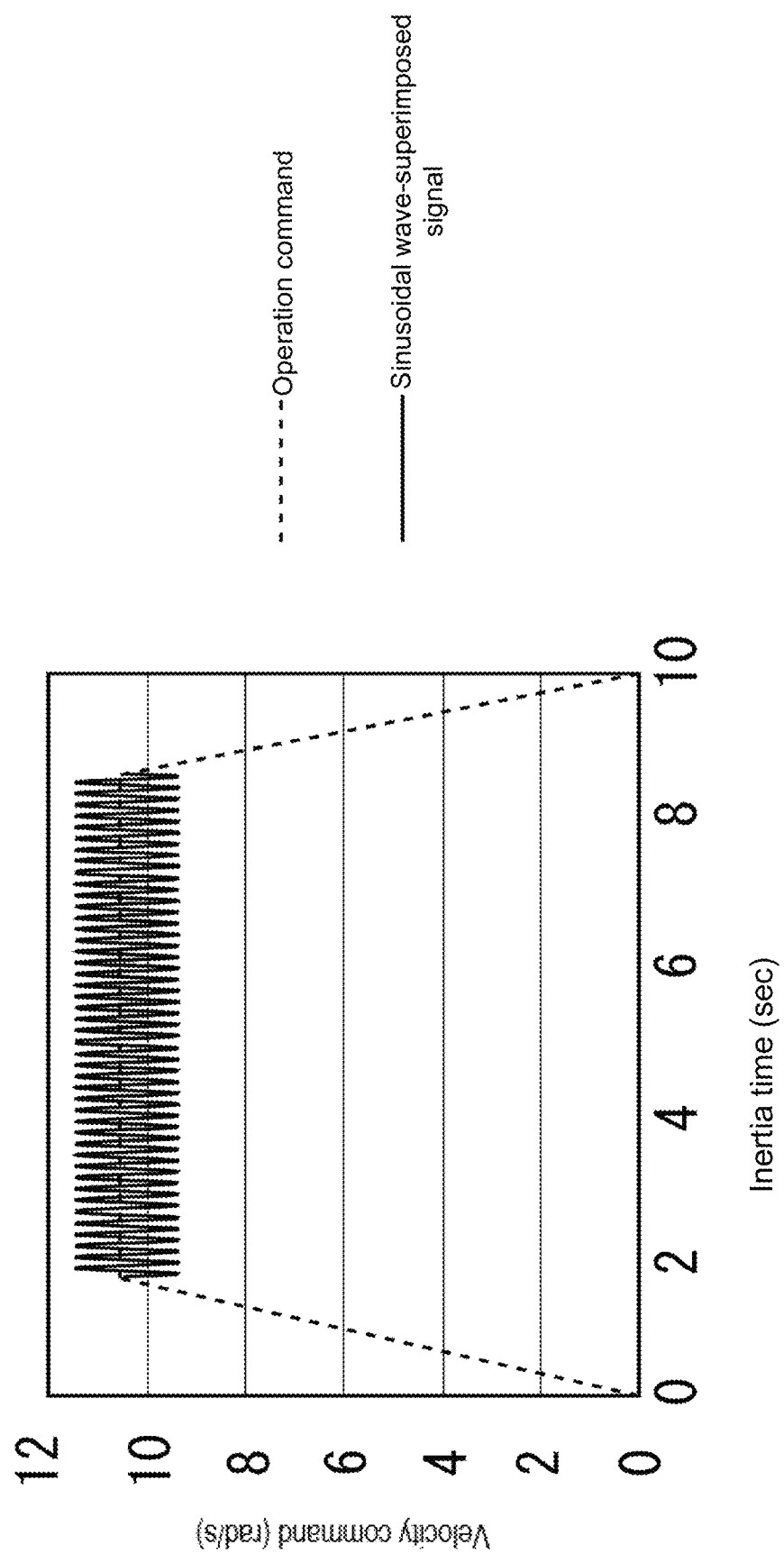
FIG. 17 is a graph showing an operation command signal of a load device in a second embodiment of the present invention.

In contrast, in the present embodiment, as shown in FIG. 17, a sinusoidal signal is superimposed on an operation command signal directed to the load device 42. This operation enables an operation command signal to constantly include a single frequency independently of the type of operation command directed to the load device 42, and enables accurate measurement of the frequency response characteristic for a single frequency. The frequency of the sinusoidal signal to be superimposed may be a single frequency or the sum of sinusoidal waves of multiple different frequencies.

Figure 18:
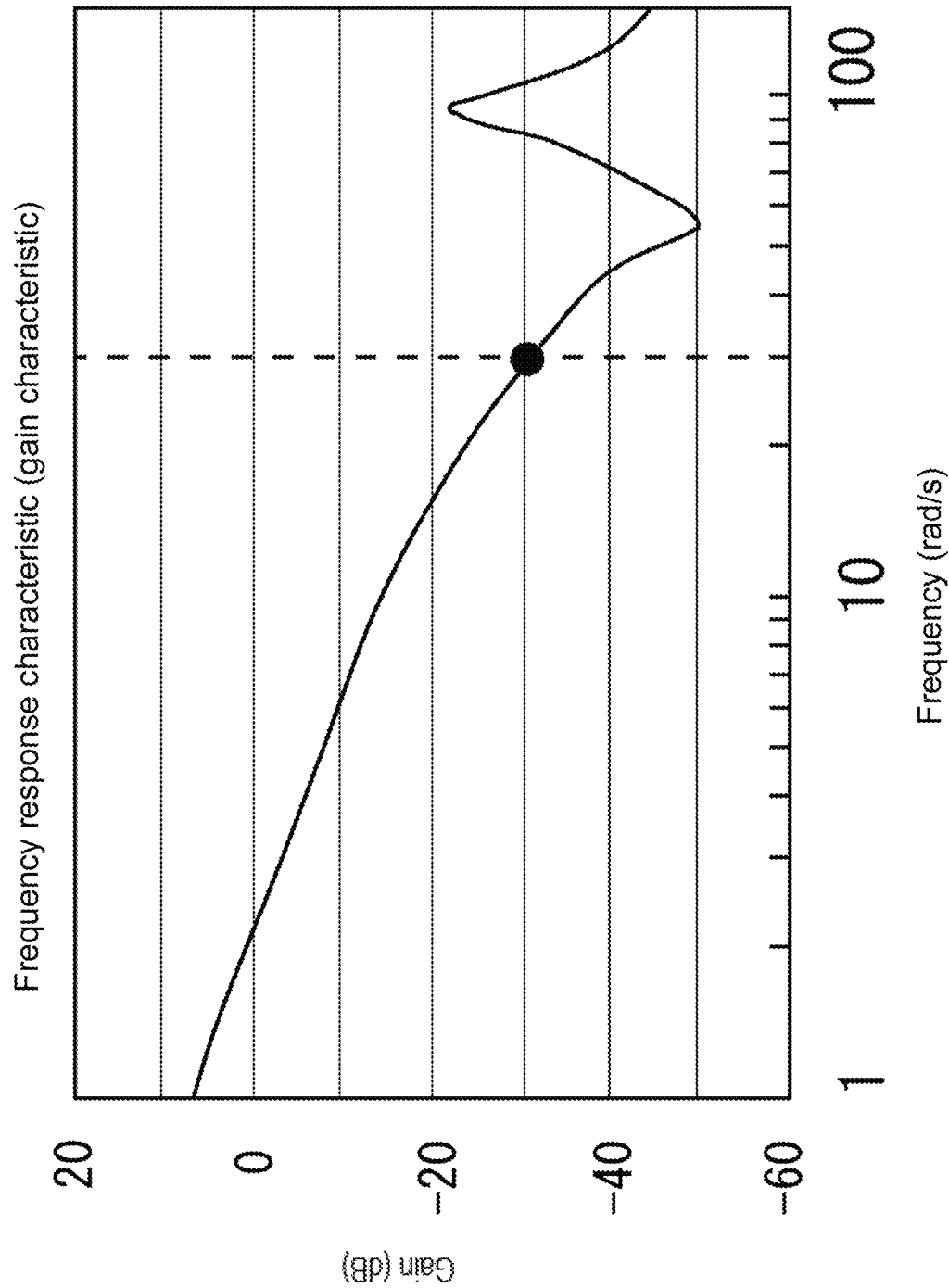
FIG. 18 is a graph showing the relationship between a frequency response characteristic of the load device and the frequency of a sinusoidal signal to be superimposed in the second embodiment of the present invention.

FIG. 18 shows the relationship between the frequency response characteristic of the load device 42 and the frequency of the sinusoidal signal to be superimposed. The curve drawn with a solid line represents the frequency response characteristic of the load device 42. The straight line drawn with a broken line represents the frequency of the sinusoidal signal to be superimposed. The frequency response characteristic for a single frequency repeatedly obtained during the operation of the load device 42 corresponds to the response characteristic of the frequency to a sinusoidal signal marked with a black dot in FIG. 18.

As shown in FIG. 18, in the present embodiment, the frequency of the sinusoidal signal to be superimposed on the operation command signal of the load device 42 is lower than resonant and antiresonant frequencies of the load device 42. Thus, the response characteristic for a single frequency input can be accurately measured without being affected by the resonance or antiresonance of the load device 42. The resonant and antiresonant frequencies of the load device 42 may be obtained from the frequency response characteristic of the load device 42 obtained at the reference position.

The frequency of the sinusoidal signal to be superimposed on the operation command signal of the load device 42 may be in a band approximate to −20 dB/dec in the open-loop frequency response characteristic in the reference posture. This enables a frequency in a band sufficiently apart from the resonant and antiresonant frequencies to be selected as the frequency of the sinusoidal signal to be superimposed on the operation command signal of the load device 42, and enables more reliable measurement of more accurate response characteristics without the effects of the resonance or antiresonance. To set the frequency of the sinusoidal signal to be superimposed on the operation command signal of the load device 42 to be lower than the resonant and antiresonant frequencies of the load device 42, the resonant and antiresonant frequencies are to be known in advance. These resonant and antiresonant frequencies are obtained from the frequency response characteristic in the reference posture.

In the present embodiment, a section in which a sinusoidal signal is superimposed on an operation command is a section of the operation command that causes the load device 42 to operate at a constant velocity. A command for velocity adjustment of the load device 42 may originally include a frequency signal for checking the frequency response characteristic for a single frequency, and superimposing a sinusoidal signal on the command may lower the measurement accuracy of the frequency response characteristic. In contrast, the section in which a sinusoidal signal is superimposed on an operation command of the load device 42 is set to a section of the operation command in which the load device 42 is operated at a constant velocity. This prevents intrusion of a signal of a frequency the same as the frequency of the sinusoidal signal to be superimposed, and enables more accurate frequency response characteristic of the load device 42 to be obtained for a single frequency.

Figure 19:
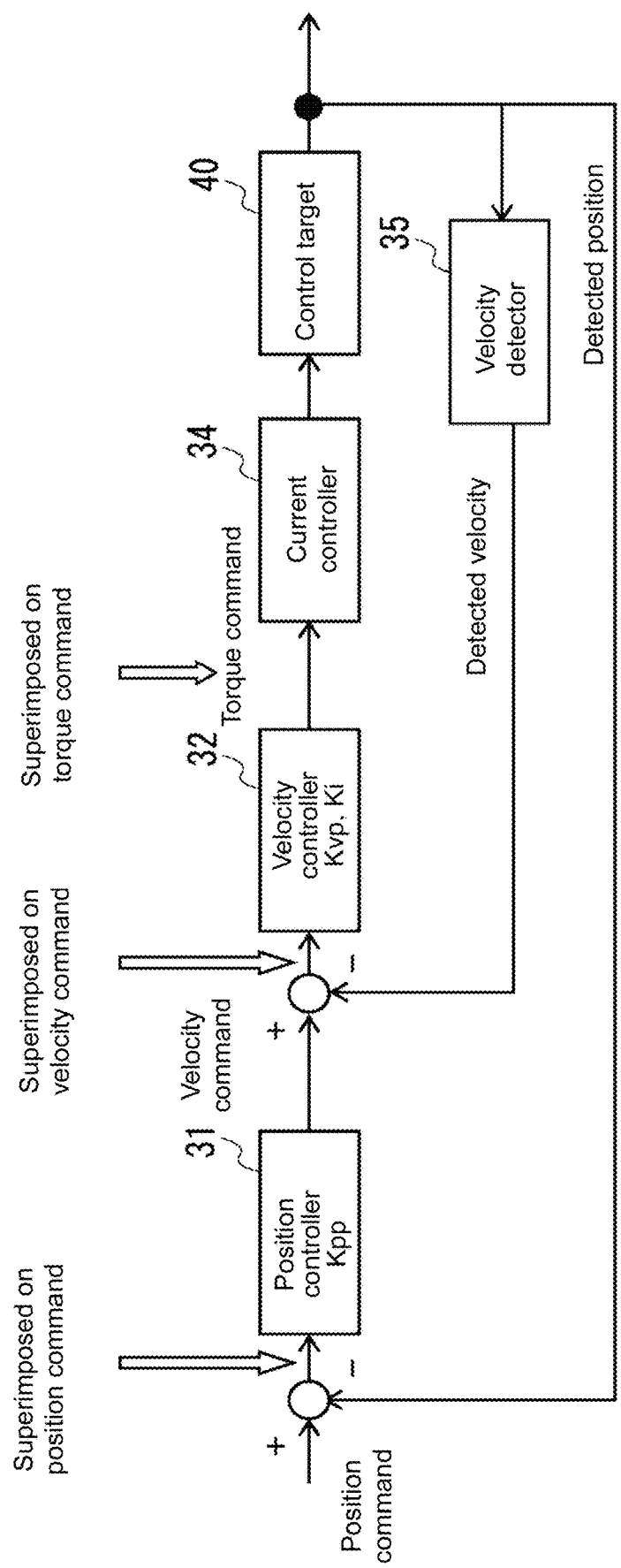
FIG. 19 is a block diagram showing the points at which command signals instructing to superimpose a sinusoidal signal are input in the second embodiment of the present invention.

As shown in FIG. 19, in the present embodiment, a command signal on which a sinusoidal signal is superimposed is any one of a position command signal, a velocity command signal, and a torque command signal. FIG. 19 shows the control block diagram of the motor control apparatus 30. A sinusoidal signal is superimposed on any of the position command signal, the velocity command signal, and the torque command signal, and obtaining an output of the control target 40 in response to the resulting signal enables checking of the frequency response characteristic for a single frequency.

Third Embodiment

A third embodiment of the present invention will now be described. In the example described in the present embodiment, the control target 40 includes a combination of multiple load devices 42 (multiple axes), and an axis-combined stability map is generated by overlapping combined stability maps obtained for the respective load devices 42.

The present embodiment involves simultaneous control of multiple coupled load devices 42 (hereafter simply referred to as axes) such as for a gantry device that moves two axes including X-direction and Y-direction. Applying a control parameter adjusted for control of a specific axis to control of another axis may cause an unstable operation of the entire control target 40. In contrast, in the present embodiment, a combined stability map is generated for each axis, and the combined stability maps for the respective axes are further combined to generate an axis-combined stability map.

Figures 20A, 20B:
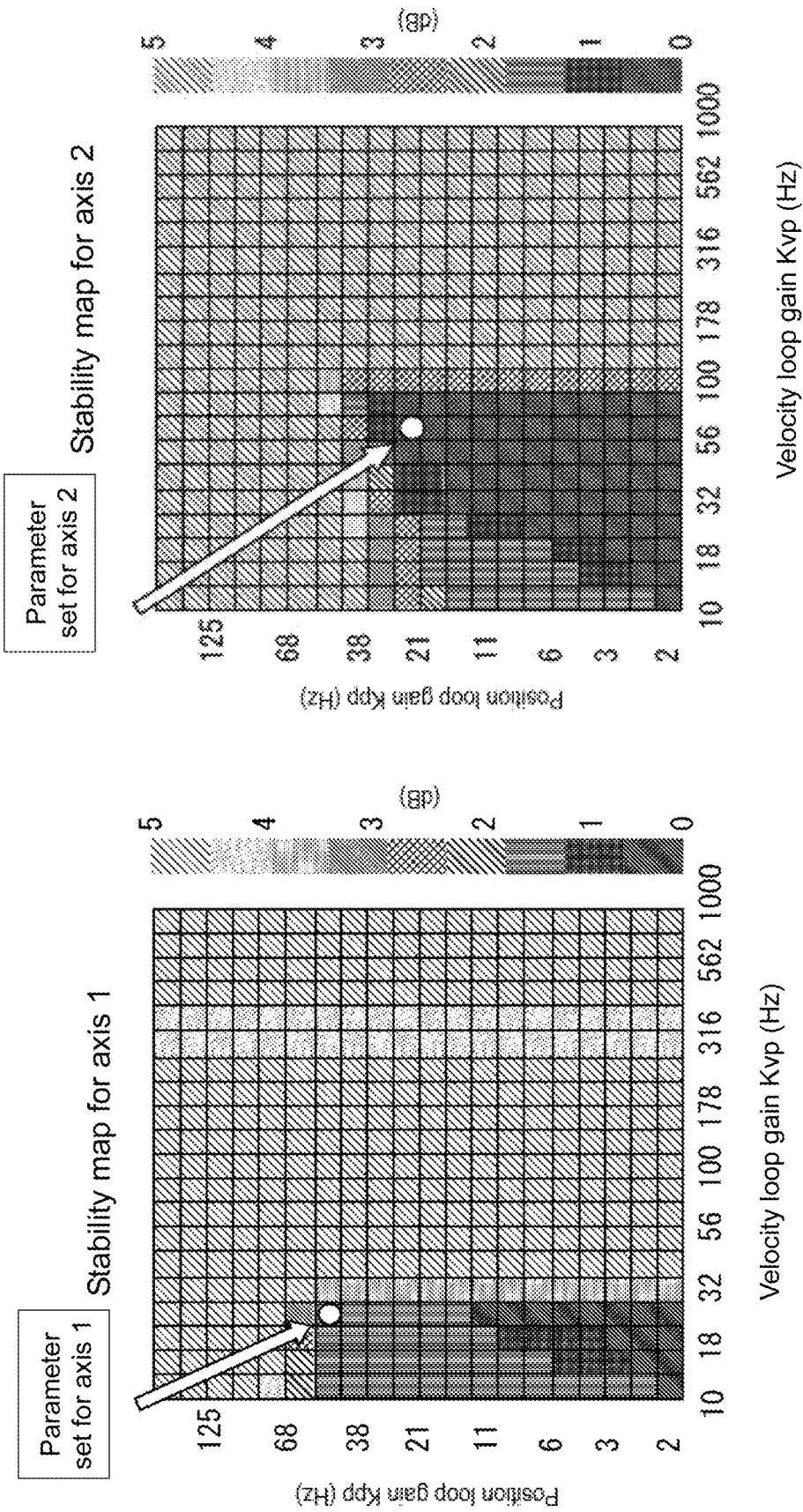
FIGS. 20A and 20B are diagrams showing combined stability maps for each load device in a third embodiment of the present invention.

More specifically, as shown in FIGS. 20A and 20B, a combined stability map for each load device 42 (axis) included in the control target 40 is generated by combining a stability map in the maximum-inertia posture and a stability map in the minimum-inertia posture. This combined stability map shows a lower one of evaluation index values in the stability map in the maximum-inertia posture and in the stability map in the minimum-inertia posture.

Figure 21:
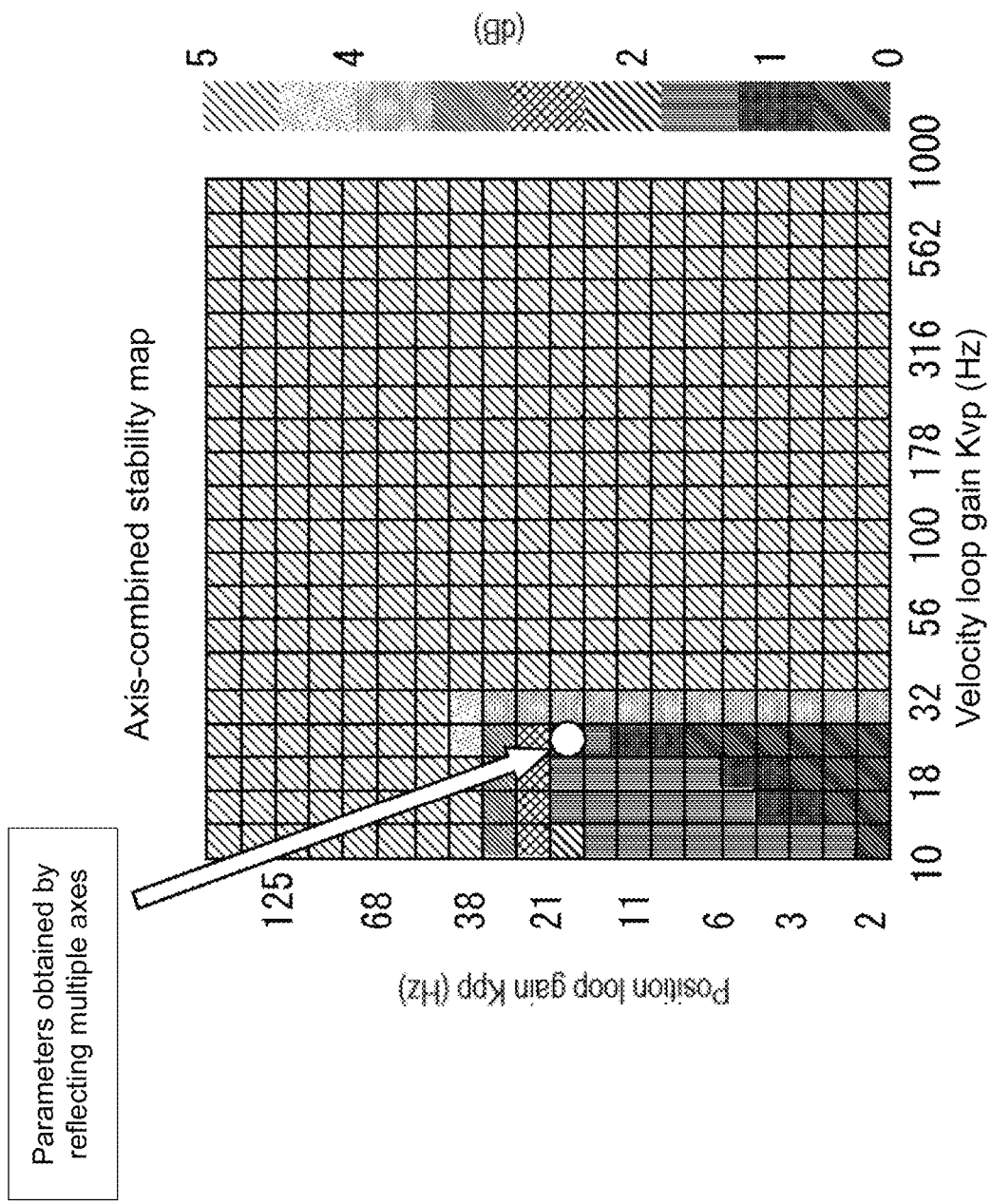
FIG. 21 is a diagram showing an axis-combined stability map in the third embodiment of the present invention.

As shown in FIG. 21, the combined stability maps for the respective load devices 42 (axes) are further combined to generate an axis-combined stability map. This axis-combined stability map shows a lower evaluation index value of the combined stability map for each load device 42 (axis) in a map form. The axis-combined stability map serves as a safety map that enables identification of the operation stability of the control target 40 including multiple coupled load devices 42 (axes).

Fourth Embodiment 4

A fourth embodiment of the present invention will now be described. In the example described in the present embodiment, optimum control parameters are automatically selected and displayed based on the stability map.

Figure 22B:
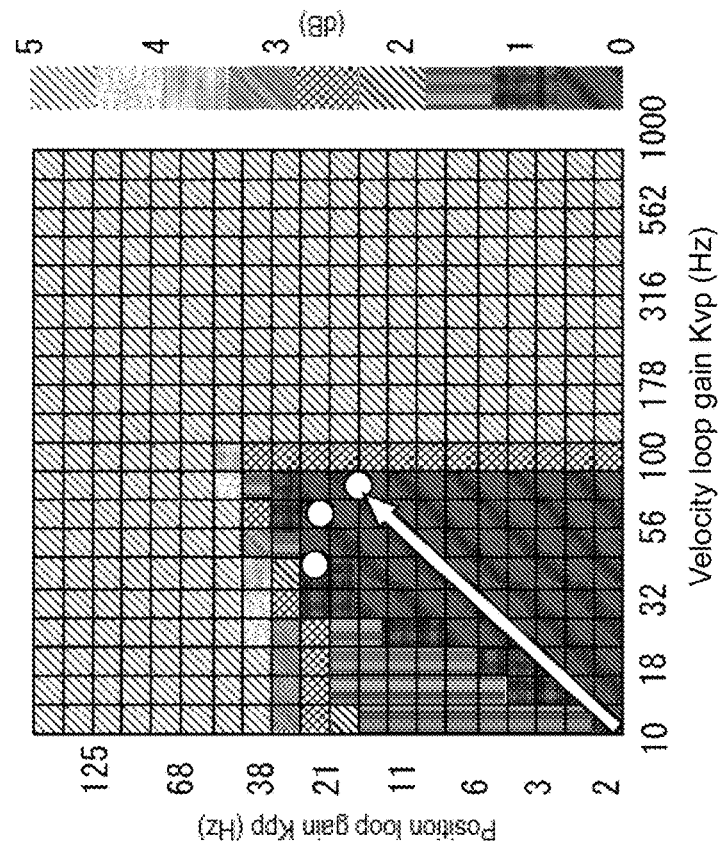
FIGS. 22A and 22B are diagrams showing stability maps in which combinations of optimum control parameters are marked in a fourth embodiment of the present invention.
Figure 22A:
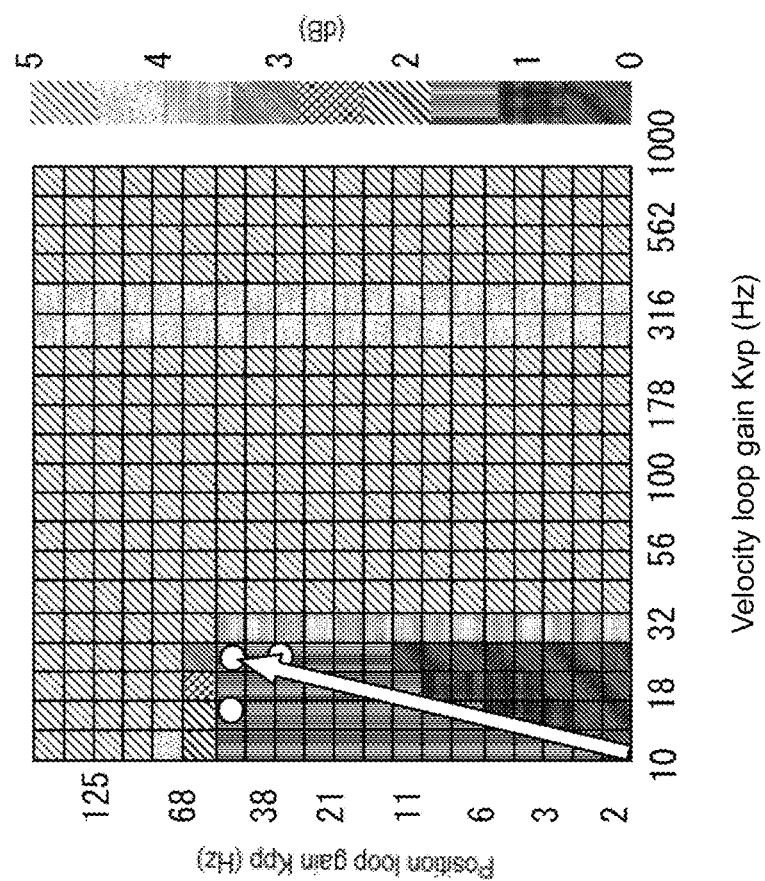

As shown in FIG. 12, for example, a combination of optimum control parameters may be marked in the stability map in the embodiment of the present invention. However, control parameters appropriately set by a user with the stability map may fail to be optimum without any specific viewpoint. In contrast, in the present embodiment, as shown in FIGS. 22A and 22B, the stability map shows, with marks, optimum ones of combinations each including the position loop proportional gain Kpp on the vertical axis and the velocity loop proportional gain Kvp on the horizontal axis in the stability map. The optimum combinations are determined from a specific viewpoint.

For example, in the example shown in FIG. 22A, points among candidate points at which the norm (for example, $(Kpp^2+Kvp^2)^{(1/2)}$) from the origin is maximum are determined as optimum points. As shown in FIG. 22B, points at which an adjustment index (Kvp in this example) is maximum may be determined as optimum points. The structure according to the present embodiment enables automatic and easy-to-see displaying of optimum ones of the combinations each including the position loop proportional gain Kpp and the velocity loop proportional gain Kvp on the horizontal axis from a predetermined specific viewpoint, and facilitates determination of control parameters.

Fifth Embodiment 5

A fifth embodiment of the present invention will now be described. In the example described in the present embodiment, the velocity controller gain is determined based on the frequency response characteristic in the minimum-inertia posture, and the position controller gain is determined based on the frequency response characteristic in the maximum-inertia posture.

In the above embodiments of the present invention, optimum ones of combinations each including the velocity loop proportional gain Kvp and the position loop proportional gain Kpp are determined based on the frequency response characteristic in the minimum-inertia posture. Actually, the velocity loop integral gain Ki is determined by multiplying the determined velocity loop proportional gain Kvp by a specific ratio. This determination cannot provide stability against a change of the velocity loop integral gain Ki.

In contrast, in the present embodiment, the velocity controller gains (Kvp and Ki) are determined based on the frequency response characteristic in the minimum-inertia posture, and the position controller gain (Kpp) is determined based on the frequency response characteristic in the maximum-inertia posture.

Figures 23A, 23B:
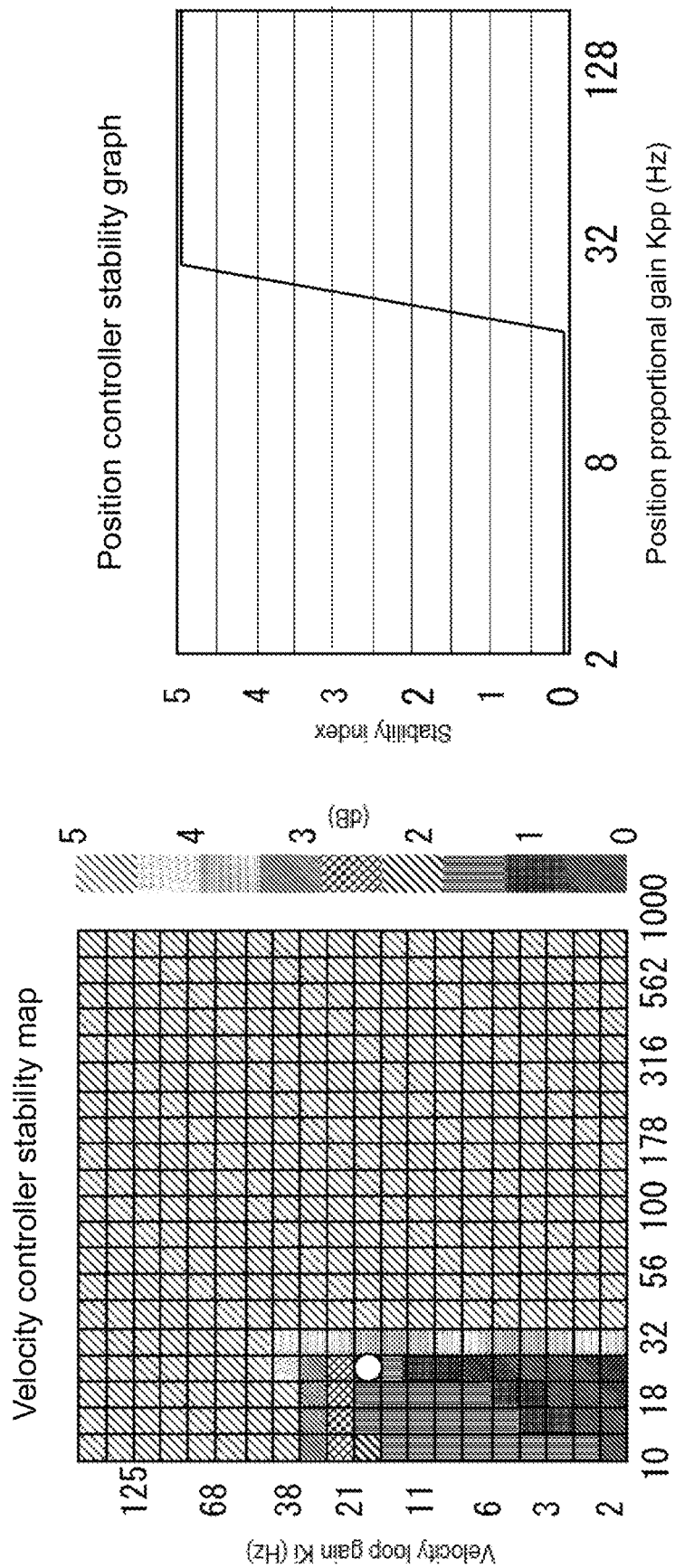
FIGS. 23A and 23B are diagrams showing a stability map for determining a velocity controller gain from a frequency response characteristic in a minimum-inertia posture, and a stability graph for determining a position controller gain based on the frequency characteristics in a maximum-inertia posture in a fifth embodiment of the present invention.

FIGS. 23A and 23B show stability maps generated in the present embodiment. FIG. 23A shows a stability map for determining the velocity controller gains (Kvp and Ki) based on the frequency response characteristic in the minimum-inertia posture. In this map, the horizontal axis indicates the velocity loop proportional gain Kvp, and the vertical axis indicates the velocity loop integral gain Ki. A combination of the velocity controller gains (Kvp and Ki) is determined based on this stability map.

Subsequently, based on the frequency characteristic in the maximum-inertia posture, the position loop proportional gain Kpp serving as a position controller gain is determined using the stability graph shown in FIG. 23B in which the velocity loop proportional gain Kvp is fixed to a determined value. This enables the position loop proportional gain Kpp, the velocity loop integral gain Ki, and the velocity loop proportional gain Kvp to be obtained more accurately.

The elements in the aspects of the present invention below are identified with reference numerals used in the drawings to show the correspondence between these elements and the components in the embodiments.

Aspect 1

A parameter setting support apparatus (10) for supporting, in control parameter setting, a control apparatus (30) for controlling a control target (40), the control target (40) including a load device (42) and a motor (41) for driving the load device, the load device (42) having inertia changeable in accordance with a posture of the load device (42) in operation, the parameter setting support apparatus (10) comprising:

a first specifier (14) configured to specify evaluation index values indicating control stability or control performance of the control apparatus (30) based on frequency response characteristics of the control target (40) in a posture of the load device (42) having maximum inertia and in a posture of the load device having minimum inertia; and a second specifier (14) configured to specify a combined evaluation index value representing an evaluation index value in the posture of the load device (42) in operation based on the evaluation index values specified, by the first specifier (14), in the posture of the load device (42) having maximum inertia and in the posture of the load device (42) having minimum inertia.

Aspect 19

A parameter setting support apparatus (10) for supporting, in control parameter setting, a control apparatus (30) for controlling a control target (40), the control target (40) including a load device (42) and a motor (41) for driving the load device, the load device (42) having inertia changeable in accordance with a posture of the load device (42) in operation, the parameter setting support apparatus (10) including a computer having tool software installed, the parameter setting support apparatus (10) comprising:

an instruction unit (14a) configured to provide an instruction about a movement and a posture of the load device (42) to the control apparatus (30);

an obtainer (14b) configured to obtain, from the control apparatus (30), a signal measured for the load device (42) and corresponding to at least one of a current position, a current velocity, or a current torque of the load device (42);

a single-frequency component obtainer (14c) configured to generate a series of command signals each obtained by superimposing a sinusoidal signal having a single frequency on at least one of a position command, a velocity command, or a torque command for controlling the load device (42), to cause the instruction unit (14a) to provide the command signals to the control apparatus (30), and to obtain a gain or a phase shift amount in the single frequency from a signal measured in response to the command signals and obtained by the obtainer;

a specific-inertia position estimator (14d) configured to cause the instruction unit to instruct the control apparatus (30) to implement a series of postures formed during movement of the load device (42) in operation, to cause the single-frequency component obtainer (14c) to obtain the gain or the phase shift amount in the single frequency in each of the postures, and to estimate postures with maximum and minimum inertia from the gain in each posture;

a frequency response obtainer (14e) configured to cause the instruction unit (14a) to instruct the control apparatus (30) to vibrate the load device within a predetermined frequency range in a reference posture selected from the series of postures, and to obtain a frequency response characteristic in the reference posture from the signal obtained by the obtainer (14b);

a frequency response estimator (14f) configured to estimate frequency response characteristics of gains in the estimated postures with the maximum and minimum inertia from the frequency response characteristic in the reference posture obtained by the frequency response obtainer (14e) and a gain or a phase shift amount for the single frequency in each of the postures obtained by the single-frequency component obtainer (14c);

a map generator (14g) configured to generate a maximum inertia stability map in a posture with the maximum inertia and a minimum inertia stability map in a posture with the minimum inertia from the frequency response characteristics estimated by the frequency response estimator (14f);

a combined-map generator (14h) configured to generate a combined stability map by combining the maximum inertia stability map and the minimum inertia stability map; and a parameter setting unit (14i) configured to display the combined stability map, to receive designation on a position on the combined stability map, and to set a control parameter based on a vertical axis value and a horizontal axis value of the designated position.

Aspect 20

A parameter setting support method for supporting, in control parameter setting, a control apparatus (30) for controlling a control target (40), the controlling target (40) including a load device (42) and a motor for driving the load device (42), the load device (42) having inertia changeable in accordance with a posture of the load device (42) in operation, the method comprising:

obtaining a frequency response characteristic for an input signal of a single frequency (S101) in a series of postures of the load device (42) in operation;

obtaining a frequency response characteristic for a predetermined frequency range in a reference posture (S102) selected from the series of postures of the load device (42) in operation;

obtaining maximum and minimum inertia values or ratios of inertia (S103) obtained in the reference posture to the maximum and minimum inertia values;

estimating frequency response characteristics in the posture (S104) with the maximum inertia value and the posture with the minimum inertia value;

generating stability maps (S105) in the posture with the maximum inertia value and the posture with the minimum inertia value based on the estimated frequency response characteristics in the posture with the maximum inertia value and the posture with the minimum inertia value;

combining the stability map (S106) in the posture with the maximum inertia value and the posture with the minimum inertia value; and setting a control parameter (S107) based on the combining the stability maps.

REFERENCE SIGNS LIST 10 parameter setting support apparatus
11 input device
12 display device
13 body
14 processor
15 user interface
16 display controller
30 motor control apparatus
31 position controller
32 velocity controller
34 current controller
35 velocity detector
40 control target
41 motor
42 load device

The invention claimed is:

1. A parameter setting support apparatus for supporting, in control parameter setting by a user, a control apparatus for controlling a control target, the control target including a load device and a motor for driving the load device, the load device having inertia changeable in accordance with a first posture of the load device in operation, the parameter setting support apparatus comprising:

a first specifier configured to specify evaluation index values indicating control stability or control performance of the control apparatus based on frequency response characteristics of the control target in a second posture of the load device having maximum inertia and in a third posture of the load device having minimum inertia;

a second specifier configured to specify a combined evaluation index value representing an evaluation index value in the first posture of the load device in operation based on the evaluation index values specified, by the first specifier, in the second posture of the load device having maximum inertia and in the third posture of the load device having minimum inertia;

a display; and a parameter setting unit, wherein the first specifier specifies the evaluation index values in the second posture and in the third posture for each of a plurality of states of the control apparatus in which the control apparatus has different values for at least one control parameter, wherein the second specifier specifies the combined evaluation index value for each of the plurality of states of the control apparatus, wherein the display is configured to display a combined stability map which displays each combined evaluation index value specified by the second specifier in association with information indicating a corresponding state of the plurality of states of the control apparatus each having the specified combined evaluation index value, wherein the parameter setting unit is configured to receive a designation of a position on the combined stability map, and to set a control parameter based on a vertical axis value and a horizontal axis value of the designated position, wherein the first specifier obtains the frequency response characteristics of the control target in the second posture of the load device having the maximum inertia and in the third posture of the load device having the minimum inertia based on a frequency response characteristic in a predetermined reference posture of the load device in operation, on a ratio of inertia of the load device in the reference posture to the inertia of the load device in the second posture having the maximum inertia, and on a ratio of the inertia of the load device in the reference posture to the inertia of the load device in the third posture having the minimum inertia, and wherein the control apparatus controls the control target based on the set control parameter.

2. The parameter setting support apparatus according to claim 1, wherein the first specifier determines the reference posture as the third posture of the load device having the minimum inertia.

3. The parameter setting support apparatus according to claim 1, wherein the first specifier obtains a frequency response characteristic of the load device in operation for a predetermined single frequency to obtain an inertia value of the load device in a predetermined posture.

4. The parameter setting support apparatus according to claim 3, wherein
the first specifier calculates the inertia value of the load device in the predetermined posture based on a gain characteristic of the load device in operation for the predetermined single frequency and a predetermined parameter set in advance.

5. The parameter setting support apparatus according to claim 3, wherein
a sinusoidal signal is superimposed on an operation command signal directed to the load device in operation.

6. The parameter setting support apparatus according to claim 5, wherein
the sinusoidal signal has a frequency lower than a resonant frequency and an antiresonant frequency of the load device.

7. The parameter setting support apparatus according to claim 5, wherein
during an operation of the load device, the sinusoidal signal is superimposed on the operation command signal in a section for operating the load device at a constant velocity.

8. The parameter setting support apparatus according to claim 5, wherein
the operation command signal on which the sinusoidal signal is superimposed includes one of a position command, a velocity command, or a torque command.

9. The parameter setting support apparatus according to claim 1, wherein
the control target includes a plurality of load devices coupled to one another,
the first specifier specifies the evaluation index value for each of the plurality of load devices included in the control target, and
the second specifier specifies the combined evaluation index value for each of the plurality of load devices included in the control target, and specifies a combined evaluation index value for the control target based on the combined evaluation index value for each of the plurality of load devices.

10. The parameter setting support apparatus according to claim 9, further comprising:
a second display configured to display the combined evaluation index value for the control target specified by the second specifier in association with information indicating a corresponding state of the plurality of states of the control apparatus each having the specified combined evaluation index value.

11. The parameter setting support apparatus according to claim 1, wherein
the combined evaluation index value specified by the second specifier is displayed in association with the information indicating the corresponding state of the plurality of states of the control apparatus each having the specified combined evaluation index value, and the displaying includes displaying a state, of the control apparatus, having the combined evaluation index value satisfying a predetermined condition together with a predetermined optimum value mark.

12. The parameter setting support apparatus according to claim 11, wherein the predetermined condition is that a norm from an origin displayed by the second display is maximum.

13. The parameter setting support apparatus according to claim 11, wherein
the predetermined condition is that the combined evaluation index value is maximum.

14. The parameter setting support apparatus according to claim 11, wherein
the predetermined condition is that one of the at least one control parameter is maximum.

15. The parameter setting support apparatus according to claim 1, wherein
a velocity controller gain is determined based on the frequency response characteristic of the control target in the third posture of the load device having the minimum inertia, and a position controller gain is determined based on the frequency response characteristic of the control target in the second posture of the load device having the maximum inertia.

16. A parameter setting support apparatus for supporting, in control parameter setting, a control apparatus for controlling a control target, the control target including a load device and a motor for driving the load device, the load device having inertia changeable in accordance with a posture of the load device in operation, the parameter setting support apparatus including a computer having tool software installed, the parameter setting support apparatus comprising:
an instruction unit configured to provide an instruction about a movement and a posture of the load device to the control apparatus;
an obtainer configured to obtain, from the control apparatus, a signal measured for the load device and corresponding to at least one of a current position, a current velocity, or a current torque of the load device;
a single-frequency component obtainer configured to generate a series of command signals each obtained by superimposing a sinusoidal signal having an arbitrarily decided single frequency on at least one of three commands which are a position command, a velocity command, or a torque command for controlling the load device, to cause the instruction unit to provide the command signals to the control apparatus, and to obtain a gain or a phase shift amount in the single frequency from the signal measured in response to the command signals and obtained by the obtainer;
a specific-inertia position estimator configured to cause the instruction unit to instruct the control apparatus to implement a series of postures formed during movement of the load device in operation, to cause the single-frequency component obtainer to obtain the gain or the phase shift amount, which changes with the postures, in the single frequency in each of the postures, and to estimate postures with the maximum and minimum inertia from the gain in each posture;
a frequency response obtainer configured to cause the instruction unit to instruct the control apparatus to vibrate the load device within a predetermined frequency range in reference posture selected from the series of postures, and to obtain a frequency response characteristic in the reference posture from the signal obtained by the obtainer;
a frequency response estimator configured to estimate frequency response characteristics of gains in the estimated postures with the maximum and minimum inertia from the frequency response characteristic in the reference posture obtained by the frequency response obtainer and a gain or a phase shift amount for the single frequency in each of the postures obtained by the single-frequency component obtainer;
a map generator configured to generate a maximum inertia stability map in a posture with the maximum inertia and a minimum inertia stability map in a posture with the minimum inertia from the frequency response characteristics estimated by the frequency response estimator;

a combined-map generator configured to generate a combined stability map by combining the maximum inertia stability map and the minimum inertia stability map; and a parameter setting unit configured to display the combined stability map, to receive designation on a position on the combined stability map, and to set a control parameter based on a vertical axis value and a horizontal axis value of the designated position, wherein the control apparatus controls the control target based on the set control parameter.

17. A parameter setting support method for supporting, in control parameter setting, a control apparatus for controlling a control target, the controlling target including a load device and a motor for driving the load device, the load device having inertia changeable in accordance with a posture of the load device in operation, the method comprising:

obtaining a frequency response characteristic for an input signal of a single frequency in a series of postures of the load device in operation;

obtaining a frequency response characteristic for a predetermined frequency range in a reference posture selected from the series of postures of the load device in operation;

obtaining maximum and minimum inertia values or ratios of inertia obtained in the reference posture to the maximum and minimum inertia values;

estimating frequency response characteristics in the posture with the maximum inertia value and the posture with the minimum inertia value;

generating stability maps in the posture with the maximum inertia value and the posture with the minimum inertia value based on the estimated frequency response characteristics in the posture with the maximum inertia value and the posture with the minimum inertia value;

combining the stability map in the posture with the maximum inertia value and the posture with the minimum inertia value and generate a combined stability map; and setting a control parameter based on the combining the stability maps, wherein the control apparatus controls the control target based on the set control parameter.

18. A non-transitory computer readable medium storing a parameter setting support program for causing a computer to perform the steps according to claim 17.

* * * * *